United States Patent [19]

Hirano

[11] Patent Number: 5,060,275

[45] Date of Patent: Oct. 22, 1991

[54] CARD TRUNK SYSTEM

[75] Inventor: Tadashi Hirano, Sayama, Japan

[73] Assignee: Data Card Japan Ltd., Tokyo, Japan

[21] Appl. No.: 386,585

[22] Filed: Jul. 27, 1989

[30] Foreign Application Priority Data

Sep. 26, 1988 [JP] Japan ............................. 63-238962

[51] Int. Cl.$^5$ ............................................. G06K 9/00
[52] U.S. Cl. ........................................ 382/1; 209/547;
209/583; 382/34
[58] Field of Search .................... 382/1, 34; 209/534,
209/547, 583, 584, 616, 621, 919, 900

[56] References Cited

U.S. PATENT DOCUMENTS

| | | | |
|---|---|---|---|
| 3,757,942 | 9/1973 | Gunn | 209/584 |
| 4,167,476 | 9/1979 | Jackson | 209/900 |
| 4,250,028 | 2/1981 | Talyzin et al. | 209/583 |
| 4,254,875 | 3/1981 | Varhelyi | 209/547 |
| 4,358,016 | 11/1982 | Richardson et al. | 209/583 |
| 4,736,441 | 4/1988 | Hirose et al. | 209/584 |

Primary Examiner—Leo H. Boudreau
Attorney, Agent, or Firm—Merchant, Gould, Smith, Edell, Welter & Schmidt

[57] ABSTRACT

A card trunk system according to the present invention includes a card storage means for storing cards in a state where they are classified by type, a card retrieval means for retrieving and taking out cards from the card storage means in a number to be machined and in the order of machining, and a card discriminating means for determining whether or not the card retrieved by the card retrieval means is a correct card. In consequence, the cards to be machined can be automatically arranged. A card trunk system of the present invention includes an input means for inputting the types of cards, the number of cards required and the machining data in the order of machining, a card accommodation means for storing a plurality of types of cards in a predetermined number and for retrieving the types of cards which are input from the input means in a number which is input from the input means, and a card processing means for processing cards on the basis of the machining data corresponding to the types of cards which have been retrieved by the card accommodation means. In consequence, the arrangement and processing of the cards can be automated.

27 Claims, 36 Drawing Sheets

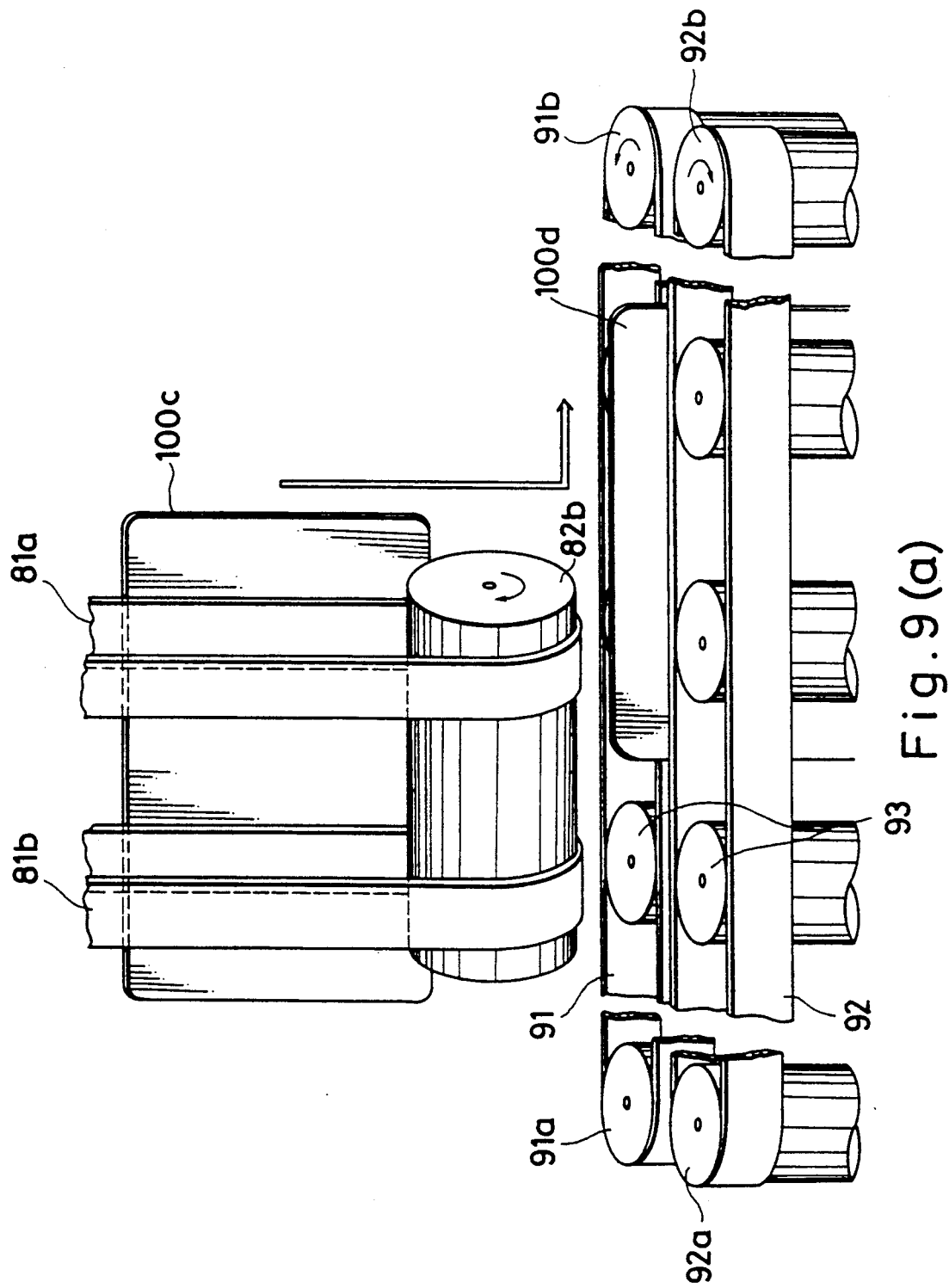

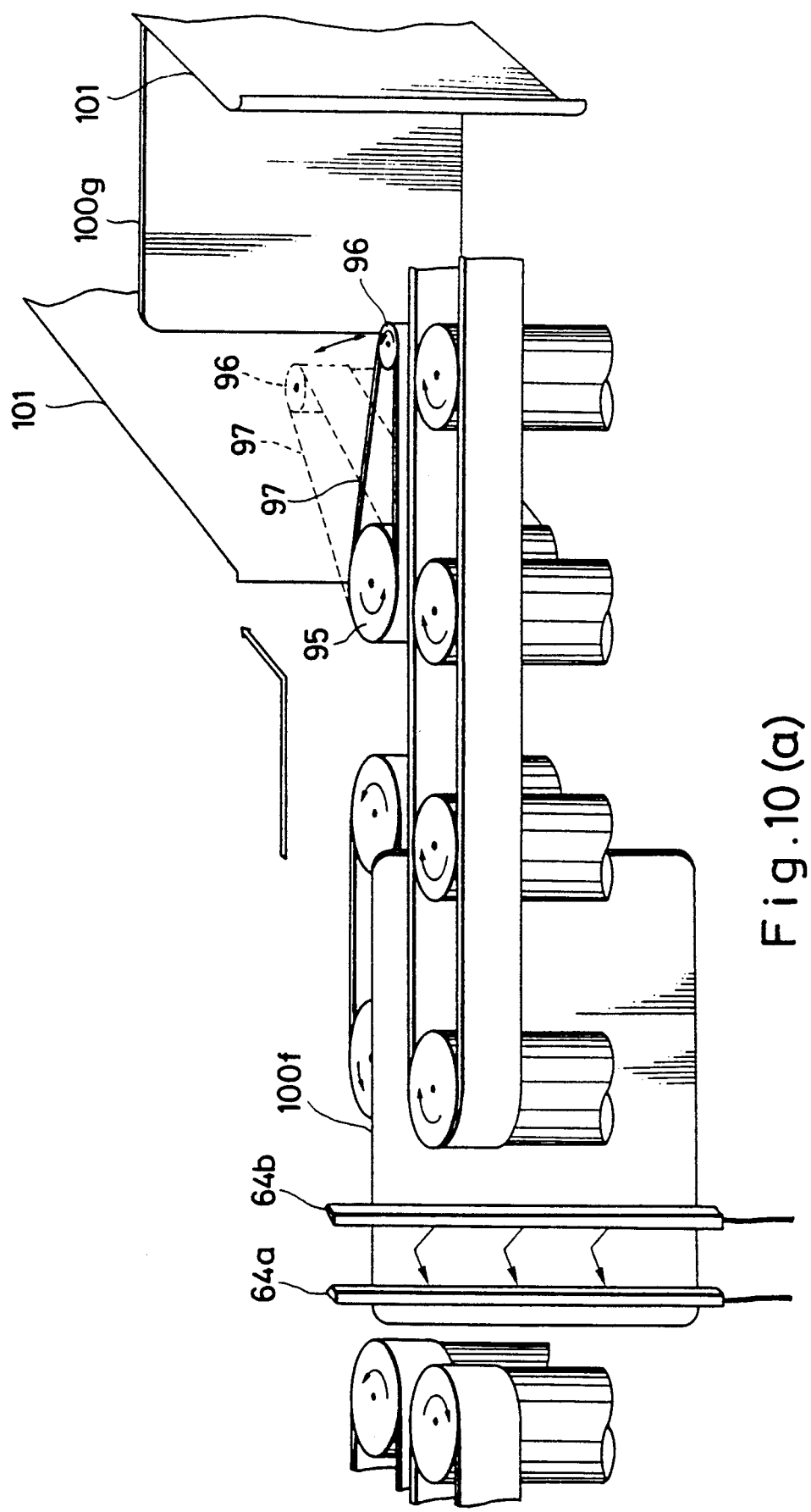

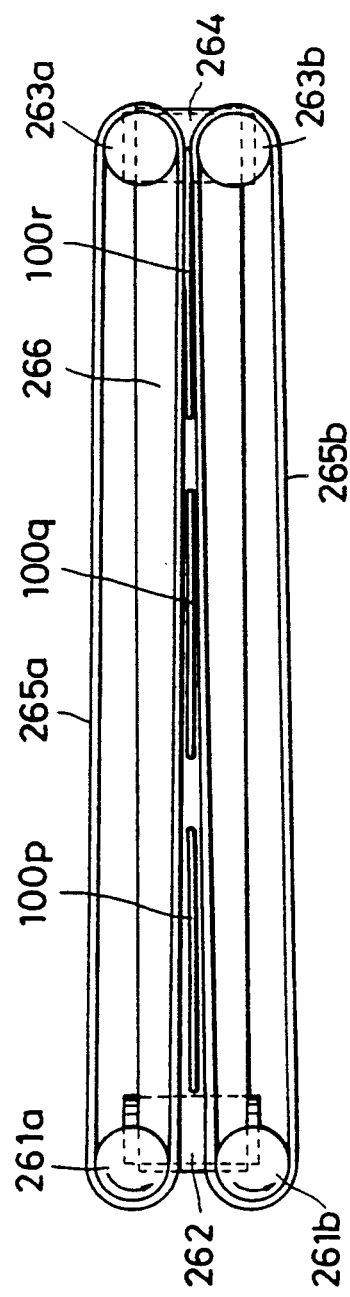
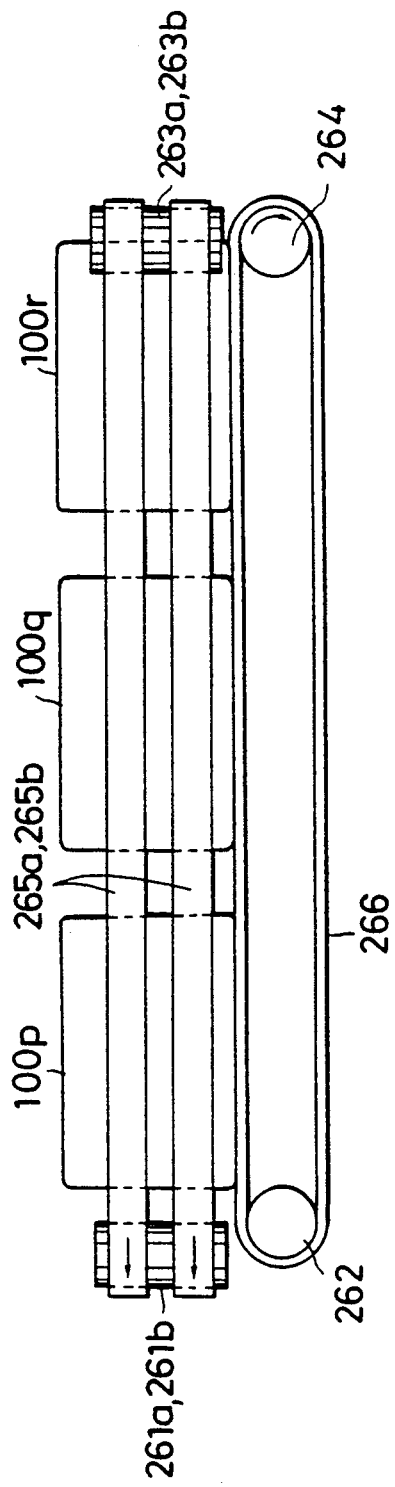
Fig.18 (a)
Fig.18 (b)

CARD TRUNK SYSTEM

BACKGROUND OF THE INVENTION

1. Field of the Invention

The present invention relates to a card trunk system, and more particularly, to a card trunk system for retrieving a plurality of types of cards stored in a state where they are classified by type in the order in which they are machined or for automatically machining the same.

2. Description of the Related Art

In recent years, the conception of affinity cards has intensified in the card industry, and issuance of many types of cards in small quantities has increased. Under these circumstances, there is an increasing demand for a system which is capable of picking out desired cards quickly in a short period of time and which enables the labor involving the issuance of cards to be reduced by reducing the labor required for the extraction of cards, by a method of stock control in which the number of existing cards can be correctly obtained or by alleviating the trouble required for stocktaking. However, there is no system that is capable of automatically retrieving many types of cards each in a small quantity in the order in which they are machined.

SUMMARY OF THE INVENTION

Accordingly, an object of the present invention is to provide a labor-saving type of card trunk system which is capable of picking out desired cards and carrying out the same in the order in which they are to be machined, without errors and in a short time.

Another object of the present invention is to provide a card trunk system which is capable of picking out desired cards, carrying out the same in the order in which they are to be machined, and machining the same, without errors and in a short time.

Another object of the present invention is to provide a card trunk system which is capable of determining whether or not a card which has been picked out is correct by means of an image thereof.

Another object of the present invention is to provide a card trunk system which is capable of picking out desired cards and carry out the same in the order in which they are to be machined, without errors and in a shorter time by parallel-processing.

To achieve these objects, the present invention provides a card trunk system which comprises: a card storage means for storing cards in a state where they are classified by type; a card retrieval means for retrieving and taking out cards from the card storage means in a number required for machining and in the order of machining; and a card discrimination means for determining whether or not the card retrieved by the card retrieval means is a correct card.

In the card trunk system according to the present invention, cards are stored in a state where they are classified by type. Cards are retrieved by the card retrieval means in a number required for machining and in the order of machining. The card discrimination means determines whether or not the card which has been retrieved is a correct one.

The present invention also provides a card trunk system which comprises: an input means for inputting the types of cards, the number of cards required and the machining data in the order of machining; a card accommodation means for storing a plurality of types of cards each in a predetermined number and for retrieving the types of cards which are input from the input means in a number which is input from the input means; and a card processing means for processing the cards on the basis of the machining data which corresponds to the types of cards retrieved from the card accommodation means.

In the card trunk system according to the present invention, the types of cards which are input by the input means are retrieved by the card accommodation means in a number which is input by the input means, and the cards which have been retrieved are then processed by the card processing means in accordance with the machining data which is input by the input means.

The card discriminating means includes an image matching means for matching card images. The image matching means includes an image input means such as a CCD.

Various types of cards in the card storage means are arranged in the form of an X-Y matrix, and the card retrieval means moves in both X and Y directions to retrieve cards.

The card storage means includes a box means being rotatable and having a plurality of boxes for accommodating predetermined number of types of cards, and a rotation control means for rotating the box which contains a designated card to a predetermined position. The card retrieval means picks out a designated card from at least on box at the predetermined position.

Card storage means includes a plurality of said box means and said rotation control means, and wherein there are a plurality of said card retrieval means corresponding to a couple of a box means and a rotation control means.

Predetermined number of said couples are controlled by a local controlling means for controlling at least rotation of boxes and picking-out of cards.

A card trunk system further comprises parallel-process controlling means for controlling a parallel rotation of the plurality of said box means and a parallel taking-out of the plurality of said card retrieval means.

The parallel taking out is controlled by said parallel-process controlling means based on signals from card sensors, each positioned in relation to said card retrieval means.

Said local controlling means includes a local operation panel used for positioning a desired box at a card supplementing place and operating in parallel with a system controlling means.

In the card trunk system according to the present invention, cards can be picked out and the cards which have been picked out are retrieved or processed in the order of machining, without errors for a short period of time.

In the system according to the present invention, an image is used to discriminate the card which has been retrieved, eliminating the need for encoding process.

In the system according to the present invention, stock control can be automatically performed and the use conditions can be automatically clarified.

Other objects and advantages of the present invention will become more apparent from the following description of the preferred embodiments thereof, taken in conjunction with the accompanying drawings.

BRIEF DESCRIPTION OF THE DRAWINGS

FIG. 4 (b) is a flowchart of the stock control operation conducted in the first embodiment;

FIG. 15 (b) is a flowchart of a card storage unit moving procedure;

FIG. 15 (c) is a flowchart of a card picking out procedure;

FIGS. 18 (a) and 18 (b) show a card conveying unit employed in the second embodiment.

FIG. 23 (b) shows the operation panel of each trunk unit;

FIG. 25 (b) shows a mechanism for picking out and conveying a card;

FIG. 25 (c) shows a mechanism for discriminating a card pocket;

DETAILED DESCRIPTION OF THE PREFERRED EMBODIMENTS

A card trunk system (hereinafter also referred to as a card accommodation system or a card processing system) according to the present invention will be described below by way of example with reference to the accompanying drawings.

Figure 1:
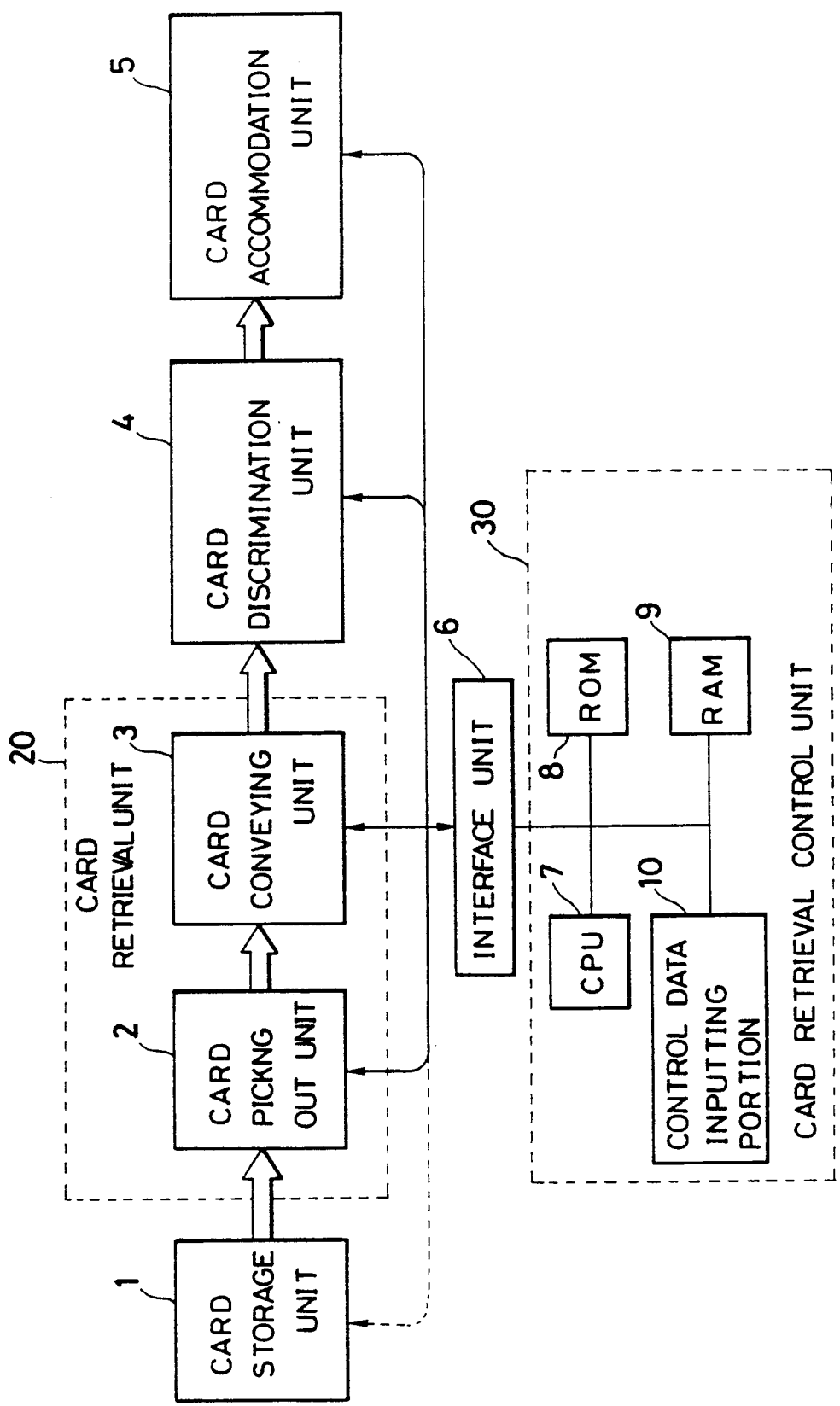
FIG. 1 is a block diagram of a card accommodation system according to the present invention.

FIG. 1 is a block diagram of a first embodiment of a card accommodation system. The card accommodation system includes a card storing unit 1 for storing a plurality of cards in a state where they are classified by type, a card picking out unit 2 for picking out cards of a designated type from the card storing unit 1, a card conveying unit 3 for conveying the card picked out from the card storing unit 1 toward a card accommodating unit 5, a card discriminating unit 4 for determining whether or not a card which is being conveyed is a correct one, and a card accommodating unit 5 for accommodating cards which have been conveyed thereto in the order in which they are machined In this embodiment, the card picking out unit 2 and the card conveying unit 3 in combination form a card retrieval unit 20.

A desired card is picked out from the card storing unit 1 by the card picking out unit 2, and the card which has been picked out is conveyed to the card accommodating unit 5 by the card conveying unit 3. Whether or not the card which is being conveyed is a desired one is checked by the card discriminating unit 4 during the conveyance. If the conveying card is a desired card, it is sent to the card accommodating unit 5. If the card is not a desired one, it is rejected as an erroneous card, and another card may be picked out. Alternatively, the operation of the system may be stopped. An erroneous card may also be treated in another way.

The card storing unit 1 or the card picking out unit 2, the card conveying unit 3, the card discriminating unit 4 and the card accommodating unit 5 are controlled through an interface unit 6 by a card retrieval control unit 30, which includes a central processing unit 7 for processing/operating data, a ROM 8 for storing programs, a RAM 9 serving as an auxiliary storage means, and a control data input unit 10 for inputting control data, e.g., the data representing the order in which cards are machined or the data representing the required number of individual types of cards. It is to be noted that a displaying device or a printer (not shown) is connected to the car retrieval control unit 30.

First Embodiment

Figure 2:
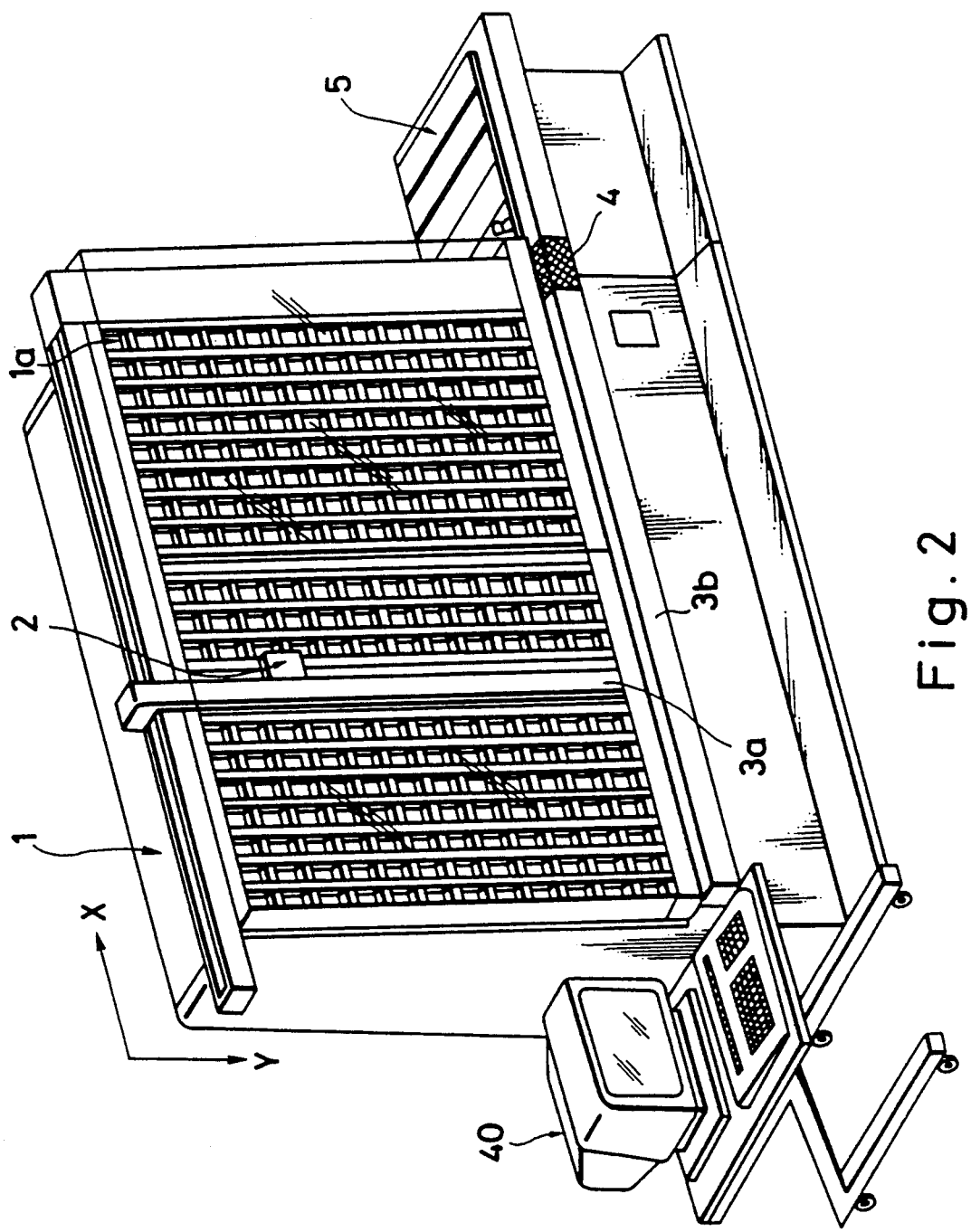
FIG. 2 is an external view of a first embodiment of the card accommodation system according to the present invention.

FIG. 2 is an external view of the first embodiment of the card accommodation system according to the present invention. The same reference numerals are used to denote parts which are the same as those in FIG. 1. The card storing unit 1 is composed of containers 1a which are arranged in the form of an XY matrix. Each container 1a contains up to 500 cards of the single type.

There are 12×21=252 containers 1a, i.e., 252 types of cards can be stored at a maximum. The card picking out unit 2 moves in both X and Y directions along a rail, like an XY plotter, and then stops in front of the container 1a which accommodates a desired card. The card conveying unit 3 includes a Y-direction conveying portion 3a for conveying a card downward within a rail which runs in the Y direction, and an X-direction conveying portion 3b for conveying a card which has dropped in an X direction to the card accommodating unit 5. In the vicinity of the end of the X-direction conveying portion 3b is disposed the card discriminating unit 4 for performing an image determination by using a CCD. In this embodiment, an image determination is performed by using the CCD. However, an image discrimination may also be performed using encoded data which is previously pre-encoded on cards magnetically. Further, the card discriminating unit 4 can be located at any point in the card conveying path.

The cards which have been determined not to be desired ones by the card discriminating unit 4 are accommodated in a container for rejected cards which is at the left side of the card accommodating unit 5 as viewed in FIG. 2. The desired cards are respectively accommodated in another four containers in sequence. The card retrieval control unit 30 employs a personal computer 40. A magnetic tape unit or the like may be connected to this personal computer 40 so that data can be input or output therethrough.

Figure 3:
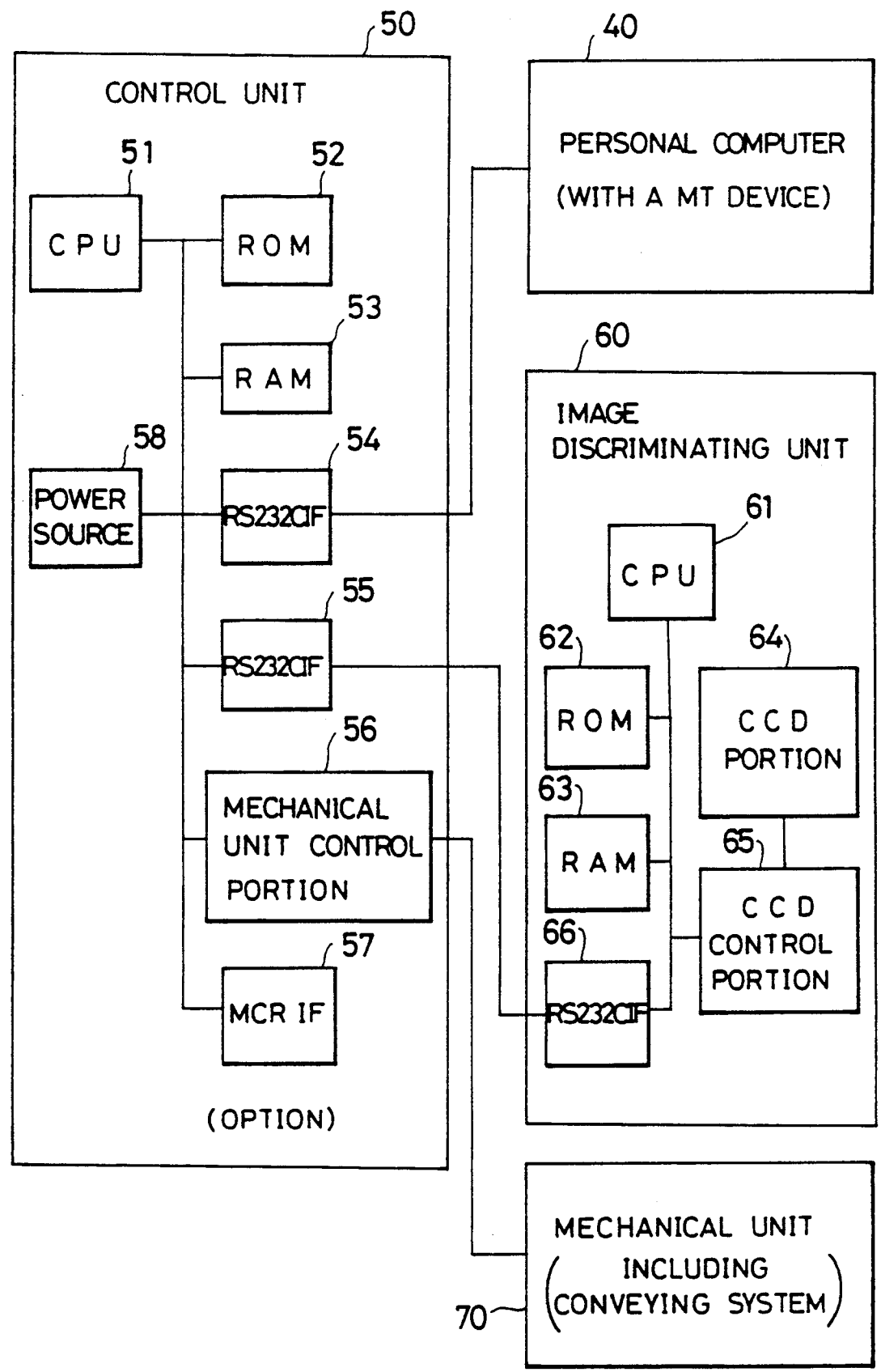
FIG. 3 shows the system configuration of the first embodiment of the card accommodation system in a practical form.

FIG. 3 shows the practical form of the first embodiment of the card accommodation system. A body control unit 50 includes a CPU 51 for processing and operating data, a ROM 52 for storing programs, a RAM 53 serving as an auxiliary storage means, an RS232CIF 54 serving as an interface between the body control unit 50 and the personal computer 40, an RS232CIF 55 serving as an interface between the body control unit 50 and an image discrimination unit 60 with a CCD incorporated therein, a mechanical unit control portion 56 for controlling a mechanical unit 70 including the card picking out unit 2, the card conveying unit 3 and the card accommodating unit 5, and a power source 58. An MCR IF 57 serving as an interface between the body control unit 50 and an MCR may be optionally included.

The image discriminating unit 60 which is the card discriminating unit 4 includes a CPU 61 for processing/operating data, a ROM 62 for storing programs, a RAM 63 serving as an auxiliary storage means, a CCD portion 64 with a CCD and a lamp incorporated therein, a CCD control portion 65 for controlling the CCD portion 64, and a RS232CIF 66 serving as an interface between the body control unit 50 and the image discriminating unit 60.

Next, the operation of this card accommodation system will be described with reference to FIGS. 4 (a), 4 (b), 5 and 6.

First, in step S1, control data representing at least the types of cards and the number of individual types of cards is input from a floppy disk of the personal computer 40 or the magnetic tape unit in the case where the personal computer 40 is equipped with it. The control data is created, for example, in the order in which the cards represented by the control data are machined and issued on that day, so that the cards can be moved on to a subsequent process such as an embossing process in the order in which they are retrieved. In this embodiment, the cards which have been retrieved are accommodated in the card accommodating unit 5 and then conveyed to a subsequent process. However, the cards retrieved may be directly sent to a subsequent process. In that case, the card accommodation system and a card embossing system are controlled synchronously. This case will be described in detail later with reference to FIGS. 11 and 12.

Next, in step S2, the position of the container 1a in which a card to be picked out is stored is extracted on the basis of the control data which has been input. Then, the card picking out u it 2 is moved to the extracted position in step S3. This operation is repeated until it is determined in step S4 that the desired position has been reached.

Figure 5:
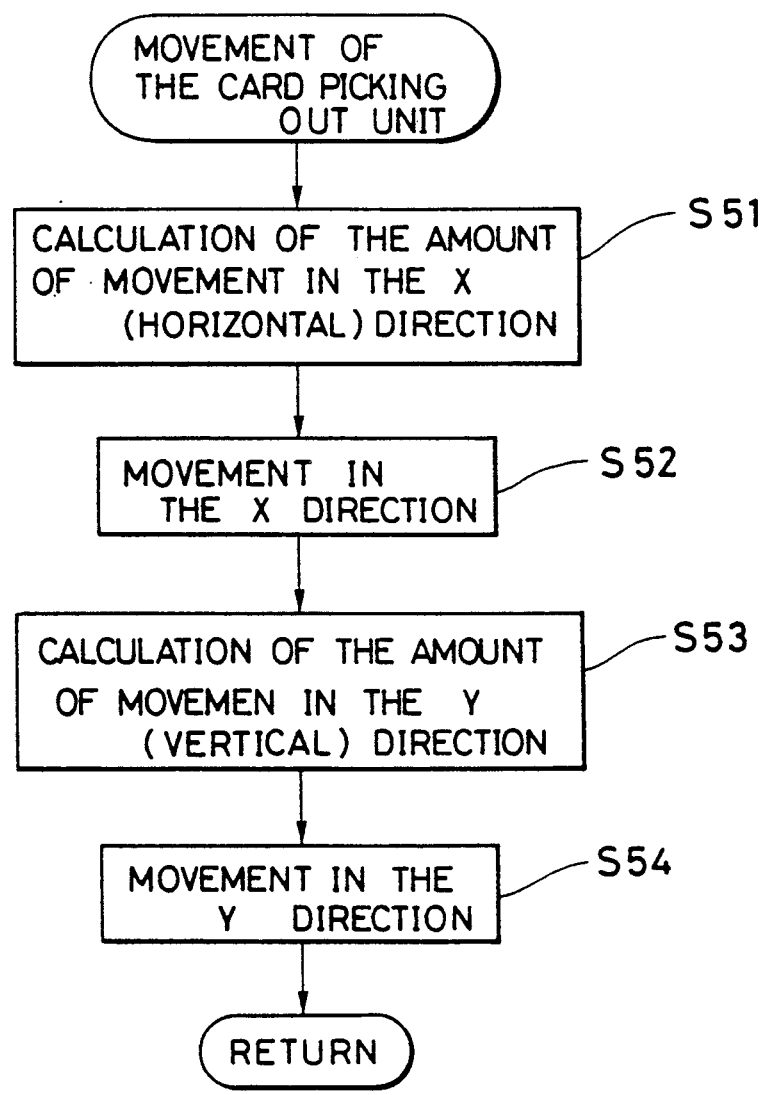
FIG. 5 is a flowchart of the movement of a card picking out unit.

Movement of the card picking out unit 2 will be described in detail with reference to FIG. 5. First, the amount of movement in the X (horizontal) direction is calculated in step S51, and the card picking out unit 2 is then moved in the X direction by the obtained value in step S52. Next, the amount of movement in the Y (vertical) direction is calculated in step S53, and movement of the card picking out unit 2 in the Y direction is then performed in step S54. In this embodiment, the card picking out unit 2 is moved in the Y direction after it has been moved in the X direction. However, movement of the card picking out unit 2 may also be performed first in the Y direction then in the X direction. Alternatively, it may be performed in both X and Y directions at the same time. Furthermore, the amount of movement may be represented by a difference between the present position of the card picking out unit 2 and a target position.

Figure 7:
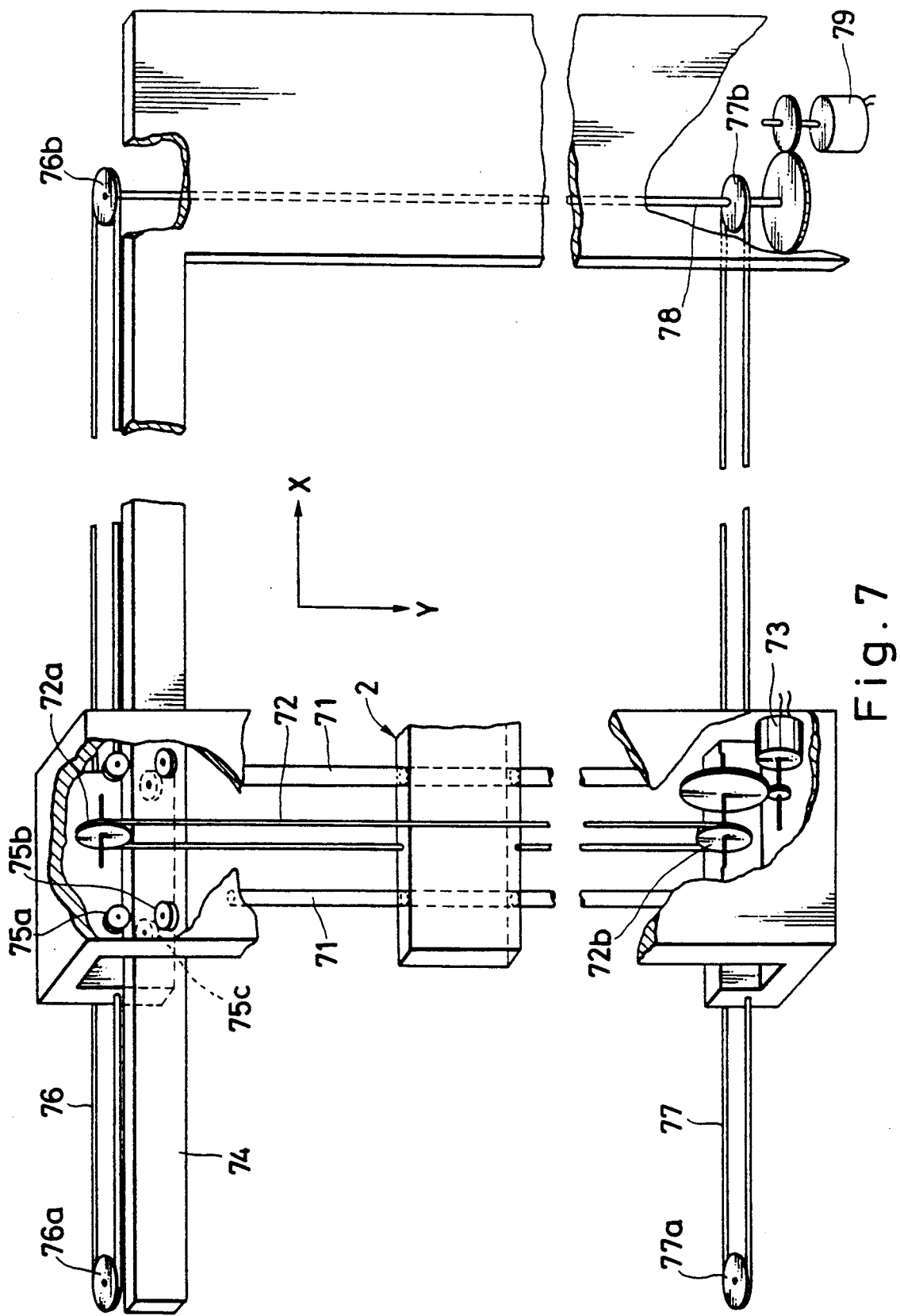
FIG. 7 shows an example of a mechanism for moving a card picking out unit.

Movement of the card picking out unit 2 is performed by means of, for example, a mechanism shown in FIG. 7. In the mechanism shown in FIG. 7, the driving force of a stepping motor 79 is transmitted to a gear 77b then to a gear 76b through a shaft 78. The card picking out unit 2 is moved in the X direction by means of belts 76 and 77 respectively extending between a pair of gears 76a and 76b and a pair of gears 77a and 77b. Smooth sliding of the card picking out unit 2 against a beam 74f is ensured by the provision of bearings 75a, 75b and 75c.

Rotation of a stepping motor 73 is transmitted to a gear 72b then to a gear 72a through a belt 72. The card picking out unit 2 is moved in the Y direction along two poles 71 by means of the belt 72. Although not shown in FIG. 7, the card picking out unit 2 is provided with a mechanism for moving an sucker 21 made of urethane rubber shown in FIG. 8 (b). In this embodiment, the amount of movement is controlled by the rotation of the stepping motors 73 and 79. However, it may also be controlled by utilizing the coordinates given to the individual containers 1a.

Figure 8A:
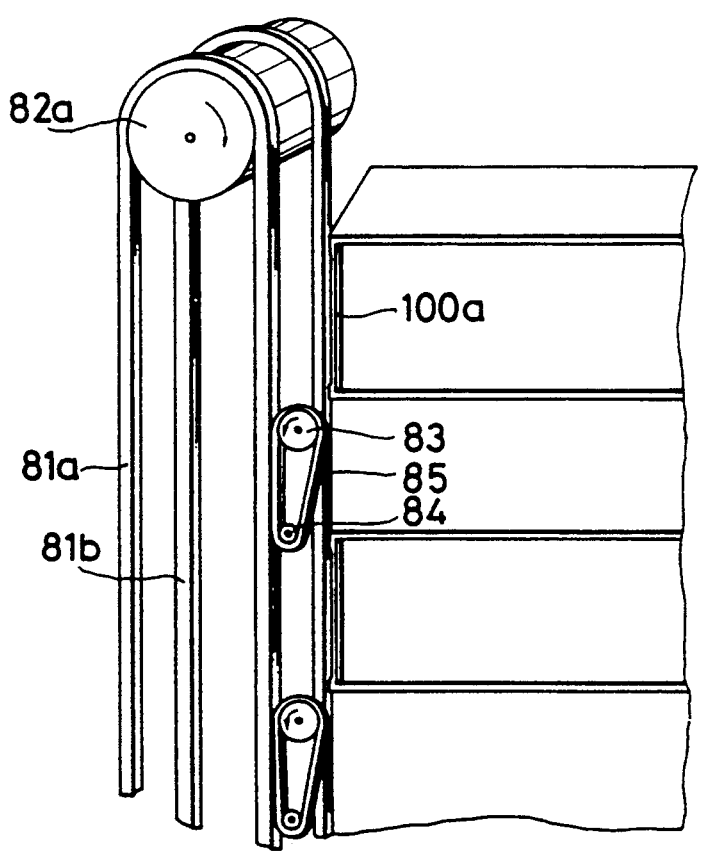
FIGS. 8 (a) and 8 (b) show an example of a mechanism for conveying a card in the Y direction.
Figure 8A:
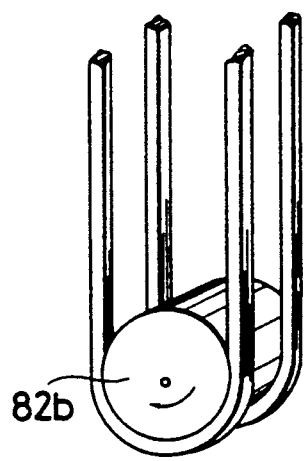
Figure 8B:
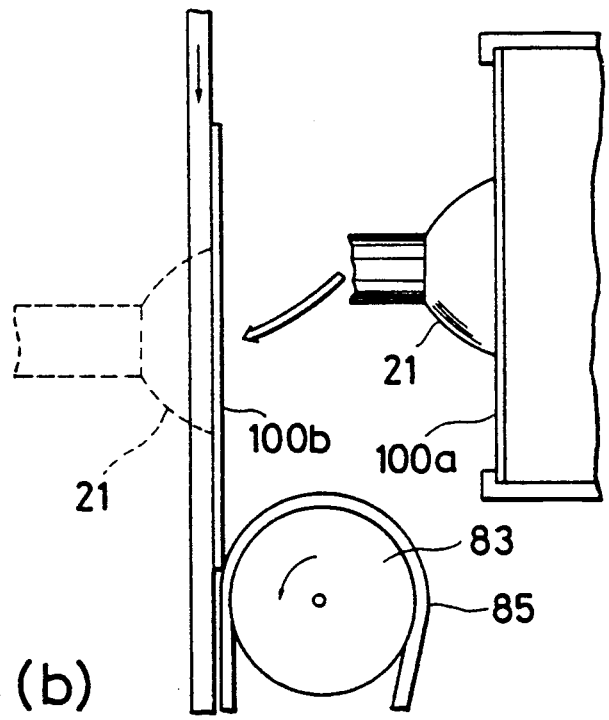

Once the card picking out unit 2 has reached a desired position, one care is picked out from the container 1a at which the card picking out unit 2 is located in step S5. A card may be picked out from the container by sucking a piece of card 100a located within the container 1a by means of the sucker 21 and then by conveying the card to the position indicated by a card 100b, as shown in FIG. 8 (b). Suction of the card is suspended when the card has reached the position indicated by the card 100b, the card 100b being then moved downward while being gripped between a belt 85 extending between rollers 83 and 84 and belts 81a and 81b extending between rollers 82a and 82b, which are rotated continuously in the direction indicated by the arrows by a motor (not shown).

Figure 9:
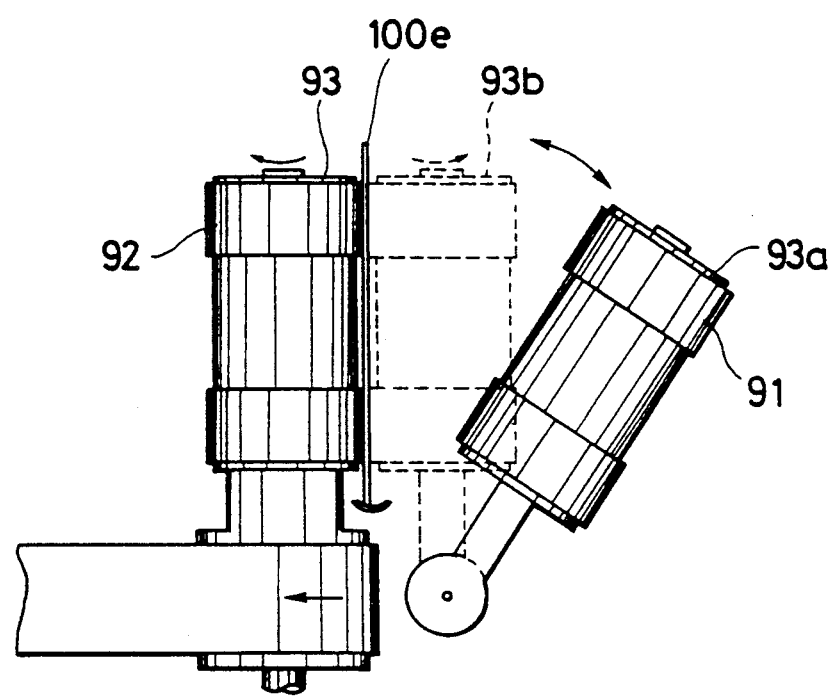
FIGS. 9 (a) and 9 (b) show an example of a mechanism for changing the direction of conveyance from the Y direction to the X direction.

FIGS. 9 (a) and 9 (b) show a mechanism for changing the direction of movement of the card from the downward direction to the horizontal direction. A card 100c which has come from above is gripped between belts 91 and 92 respectively extending between a pair of rollers 91a and 91b and a pair of rollers 92a and 92b and is then moved rightward as viewed in FIG. 9 (a), like a card 100d. Until the card 100c reaches the bottom, the rollers 91a, 91b and 93 are tilted, as shown by a roller 93a in FIG. 9 (b), and this enables the card 100c to be readily gripped between the belts 91 and 92. Once the card reaches a position indicated by a card 100e, the rollers 91a, 91b and 93 are pivoted to a position indicated by a roller 93b so as to grip the card 100e.

In the embodiment, downward movement and horizontal movement of a card is called a conveying process executed in step S6.

Figure 6:
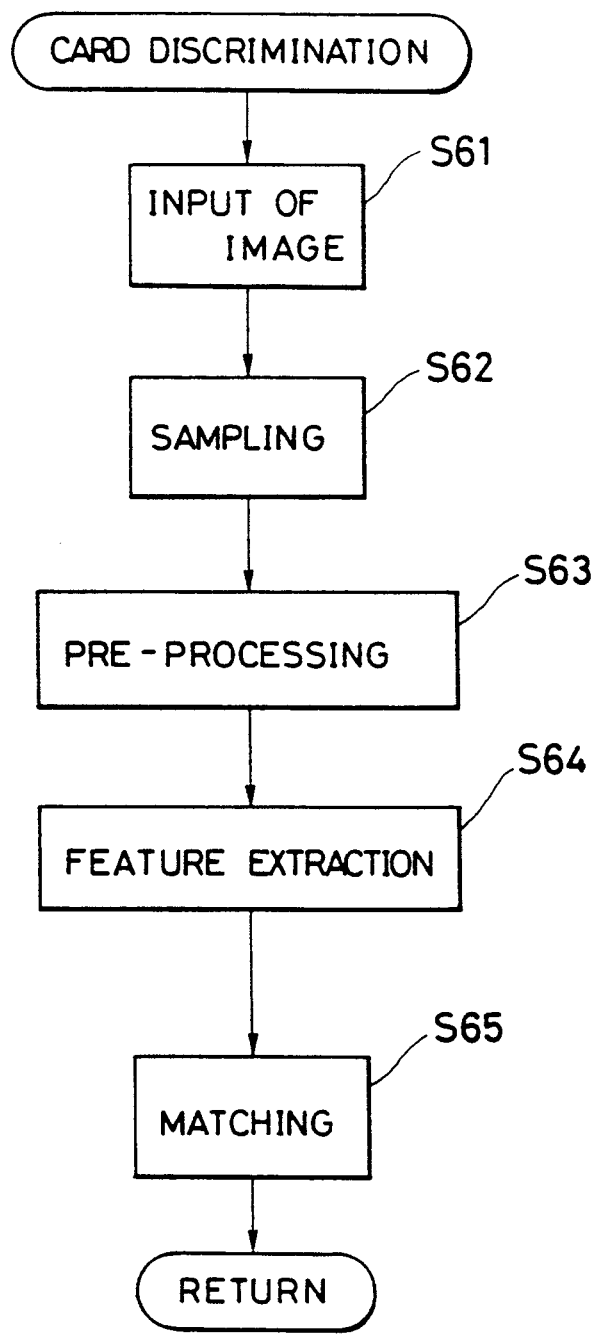
FIG. 6 is a flowchart of a card discrimination process.

Next, in step S7, a card discrimination is performed in the vicinity of the end of the conveying path. The card discrimination processing will be described below in detail with reference to FIG. 6 and FIG. 10 (a) which shows a lamp 64b and a CCD 64a in the card discriminating unit 4.

First, in step S61, an image of a card is input from the CCD 64a, and the input image is decomposed into, for example, R, G and B elements. Next, in step S62, the data representing the decomposed elements is converted into digital data, and sampling is then performed on the digital data. In step S63, preprocessing such as filtering or blurring of the image is performed. Thereafter, in step S64, feature extraction of the image which has been input is performed by means of, for example, LPC Walsh-Hadamard transform. Next, in step S65, matching is performed by utilizing the distance between the image and the previously stored data or by utilizing the DP method. Matching may also be performed by utilizing the LOGO. However, different types of cards having the same LOGO are available at present. So, matching may be preferably performed by extracting a special character from the rear surface of a card. Further, although only one surface of a card is observed for feature extraction in this embodiment, observation may also be performed on the two surfaces thereof.

Subsequently, in step S8, correctness of a card is checked on the basis of the matching performed in step S7. If the card is incorrect, error processing is performed. In this embodiment, after the incorrect card has been accommodated in a reject container in the card accommodating unit 5, the operation of the system is stopped, and the detection of an incorrect data is informed by a lamp or a sound. If the card is correct, it is determined in step S9 whether or not a required number of cards have been retrieved. If the answer is no, the processing returns to step S5, and execution of the processings from step S5 to step S9 is repeated. If a required number of cards have been retrieved, it is determined in step S10 whether or not all the cards whose control data has been input have been retrieved. If the answer is no, the processing returns to step S2, and execution of the processings from step S2 to step S10 is repeated.

Figure 10B:
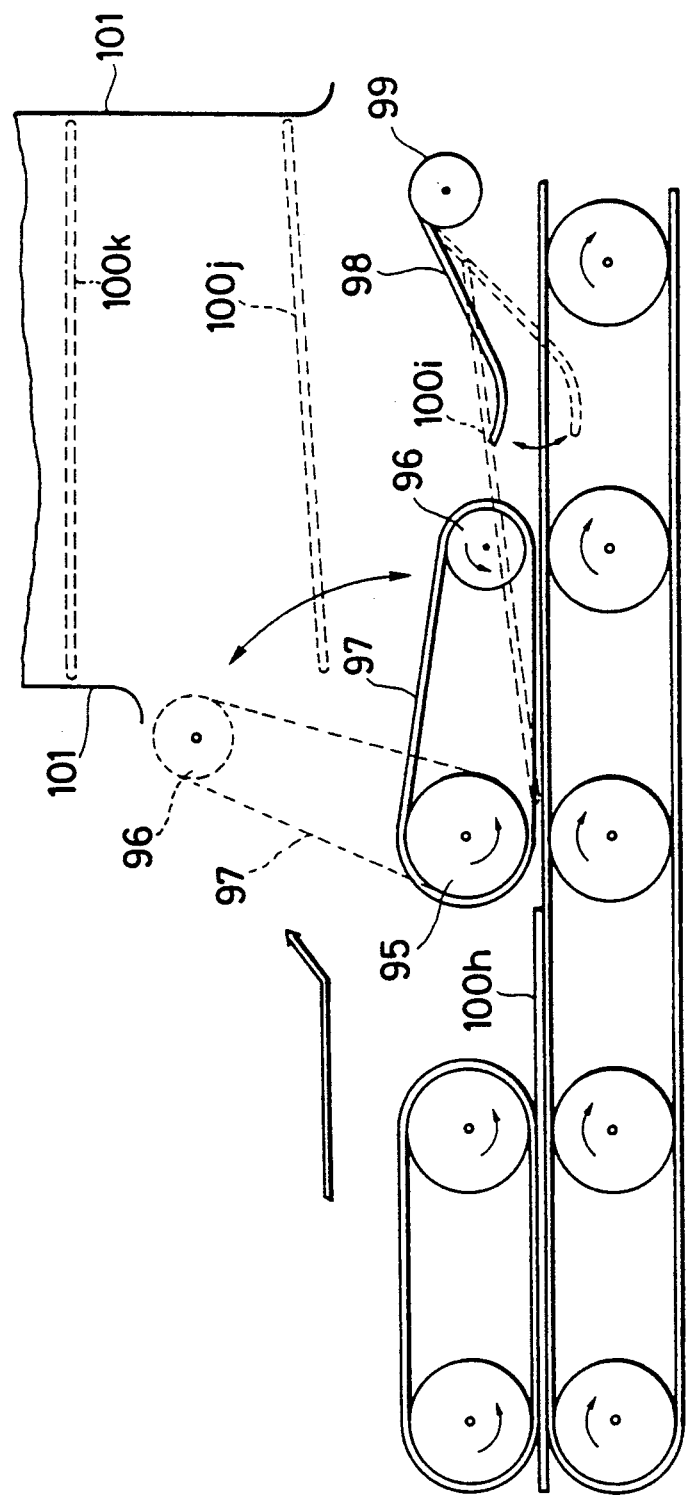
FIGS. 10 (a) and 10 (b) show an example of a mechanism for accommodating a card in a card accommodation unit.

The card on which card discrimination has been performed is accommodated in the rejected card accommodating container or any of another four containers according to the result of the discrimination. FIGS. 10 (a) and 10 (b) show a mechanism for accommodating a card into a container. After a roller 96 has been rotated about a roller 95, a card is accommodated into a container by means of a hook 98 protruding from a rotational body 99. When housed in the container 101, a card moves along the course indicated by cards 100h, 100i, 100j and 100k in FIG. 10 (b). FIGS. 10 (a) and 10 (b) show only one container. It is, however, to be noted that other containers have the same structure. It is preferable that the containers 101 have the structure which allows them to be used in the subsequent embossing process.

A card of a certain color (such as red or yellow) or a card having a different thickness may be inserted at the boundary between different types of cards or at the point of a rejected card. This can be readily realized by storing special cards in a container 1a in the card storage unit 1 which is located in the vicinity of the card discriminating unit 4.

Figure 4A:
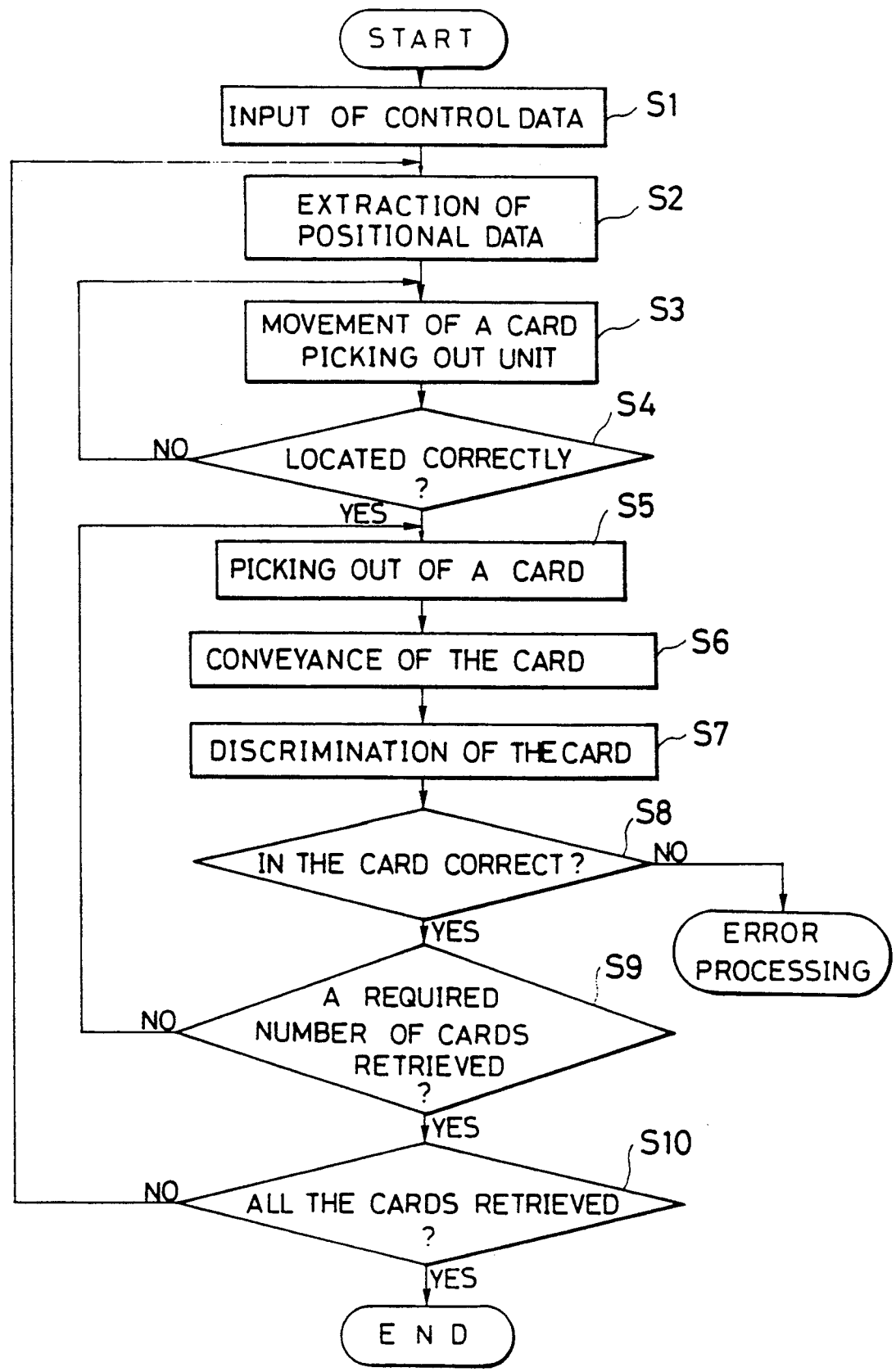
FIG. 4 (a) is a flowchart of the card retrieval operation conducted in the first embodiment.
Figure 4B:
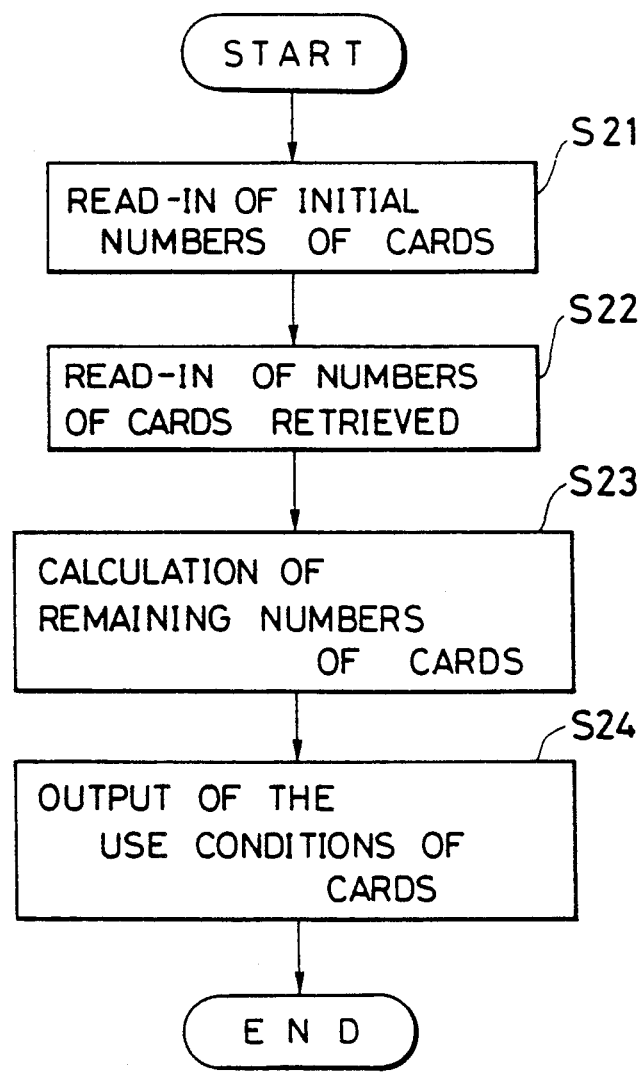

FIG. 4 (b) is a flowchart of a program used to display on a CRT or record by a printer the number of different types of cards remaining in the card storage unit 1 or the number of different types of cards which have been used. After the cards have been retrieved in the manner described with reference to FIG. 4 (a) or after retrieval of cards for a day has been completed, the number of different types of cards initially stored in the card storage unit 1 is read in from a storage means (not shown) in step S21. In step S22, the number of different types of cards which have been retrieved is read in. Thereafter, in step S23, the number of different types of cards remaining in the card storage unit 1 is calculated from the difference between the initial number of cards and the number of cards retrieved, and in step S24, the used state of the cards is output in a predetermined form of layout in step S24.

Second Embodiment

Figure 13:
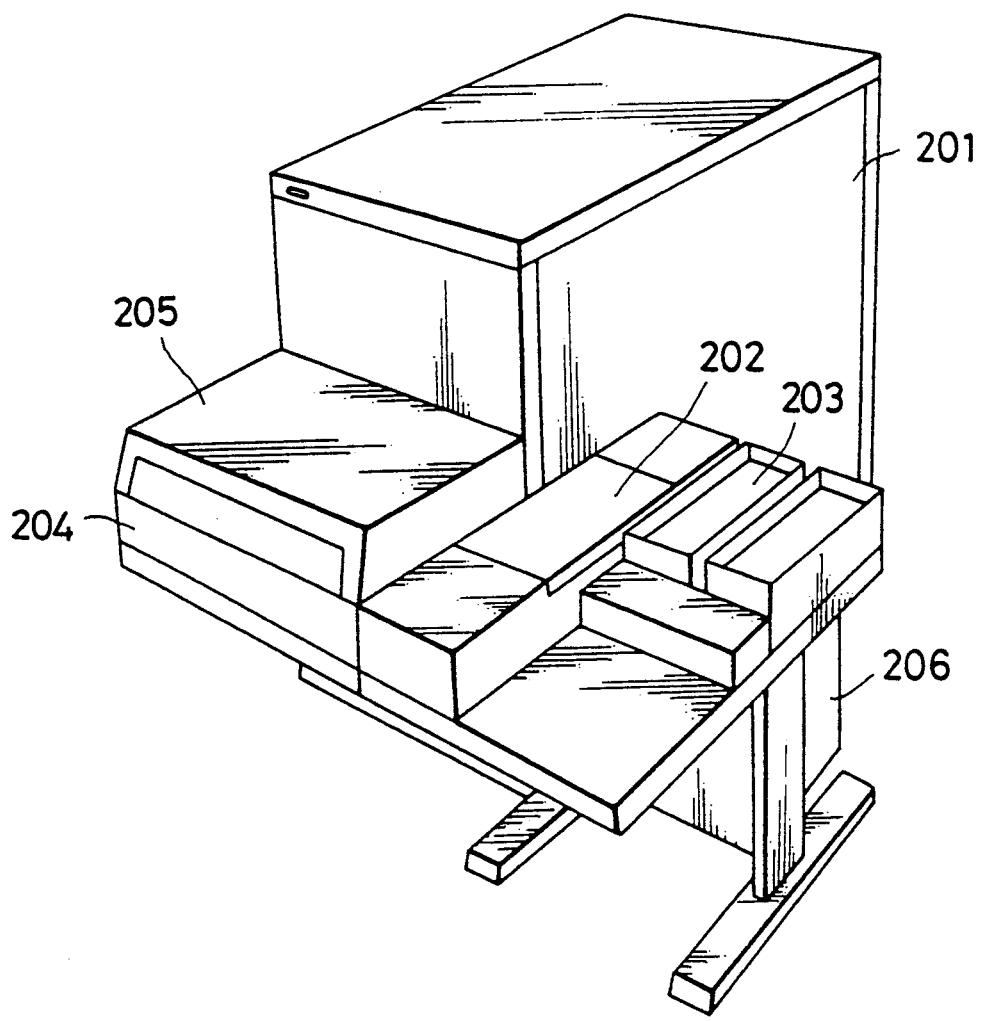
FIG. 13 is an external view of a second embodiment of a card accommodation system according to the present invention.

FIG. 13 is an external view of a second embodiment of a card accommodation system according to the present invention. Whereas the card picking out unit 2 is moved to the position of a desired card in the first embodiment, a desired card is brought to a card picking out unit by the movement of a card storage unit in the second embodiment. Hence, the card retrieval control unit 30 of this embodiment also controls the movement of a card storage unit, as shown by the dotted line in FIG. 1.

The card accommodation system shown in FIG. 13 includes a card storage unit 201, a card discriminating unit 202 for determining whether or not a card picked out is a correct one, a card accommodating unit 203 for accommodating the cards which are picked out, a card conveying unit 204 for conveying the cards which are picked out from the card storage unit 201 to the card accommodating unit 203, a remaining number counting unit 205 for counting the number of cards remaining in each container in the card accommodating unit 201, and a control unit 206 for controlling the above-described components by means of the instructions from a personal computer.

Figure 14:
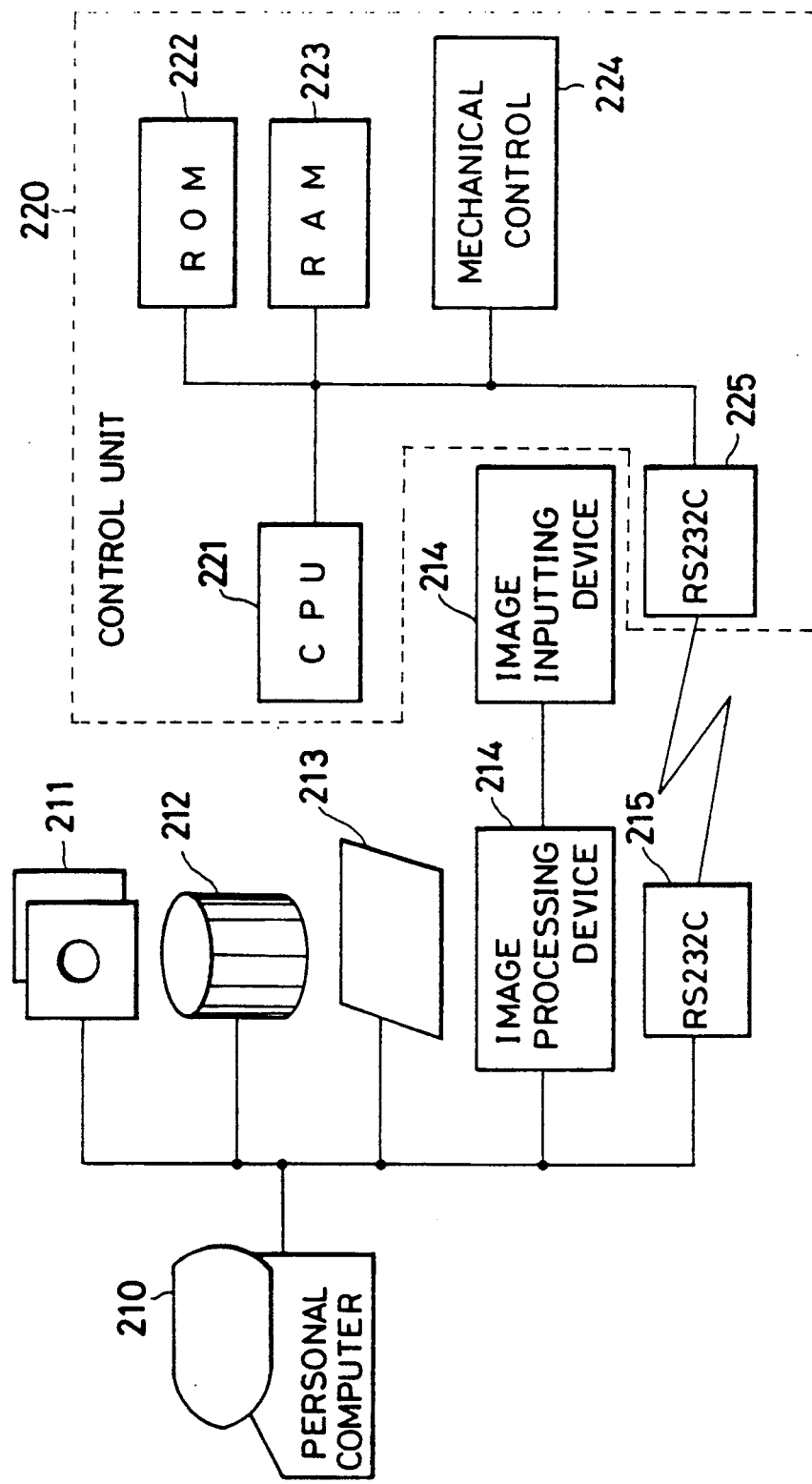
FIG. 14 shows the system configuration of the second embodiment of the card accommodation system in a practical form.

FIG. 14 shows a system configuration of the second embodiment. The card accommodation system includes a personal computer 210, a floppy disk 211 for storing data used for the card management, e.g., data representing the types of cards, the required number of cards, the remaining number of cards, and so on, a disk 212 for storing programs, a processor 213 for performing special numerical operations, an image processing device 214 connected to an image inputting device 214a used for card discrimination, and an RS232c 215 connected to an RS232c 225 of a control unit 220 which is indicated by the control unit 206 in the external view shown in FIG. 13. The control unit 220 includes a CPU 221 for operating/processing data, a ROM 222 for storing programs, a RAM 223 serving as an auxiliary storage means, and a mechanism control portion 224 for controlling the mechanisms for picking out, conveying and accommodating cards.

Now, movement of racks in the card storage unit 201 and a card picking out operation, which are characteristic of the second embodiment, will be described below in detail. The operation of other components is the same as that of the first embodiment.

Figure 15A:
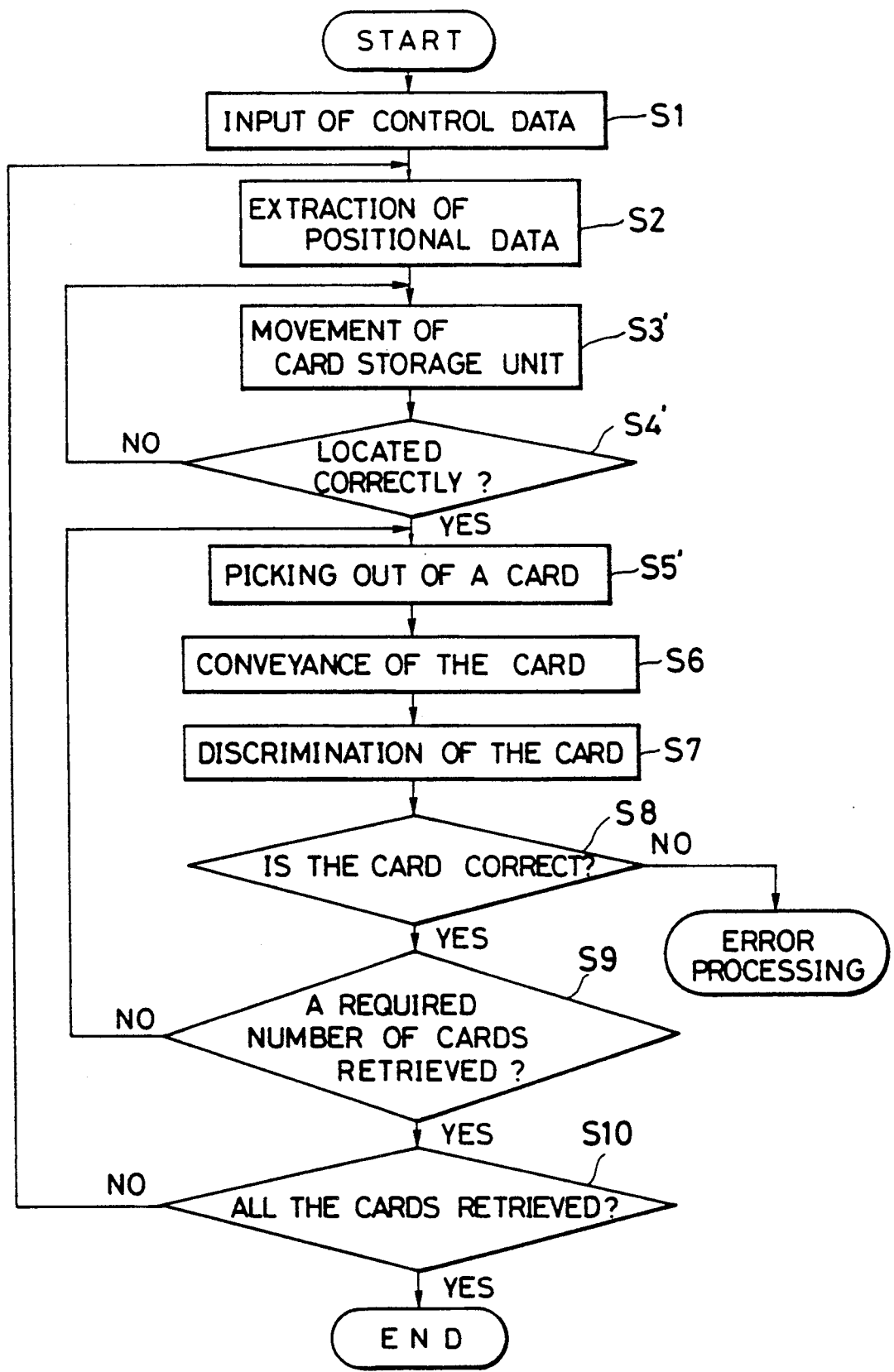
FIG. 15 (a) is a flowchart of the card retrieval operation conducted in the second embodiment.
Figure 15B:
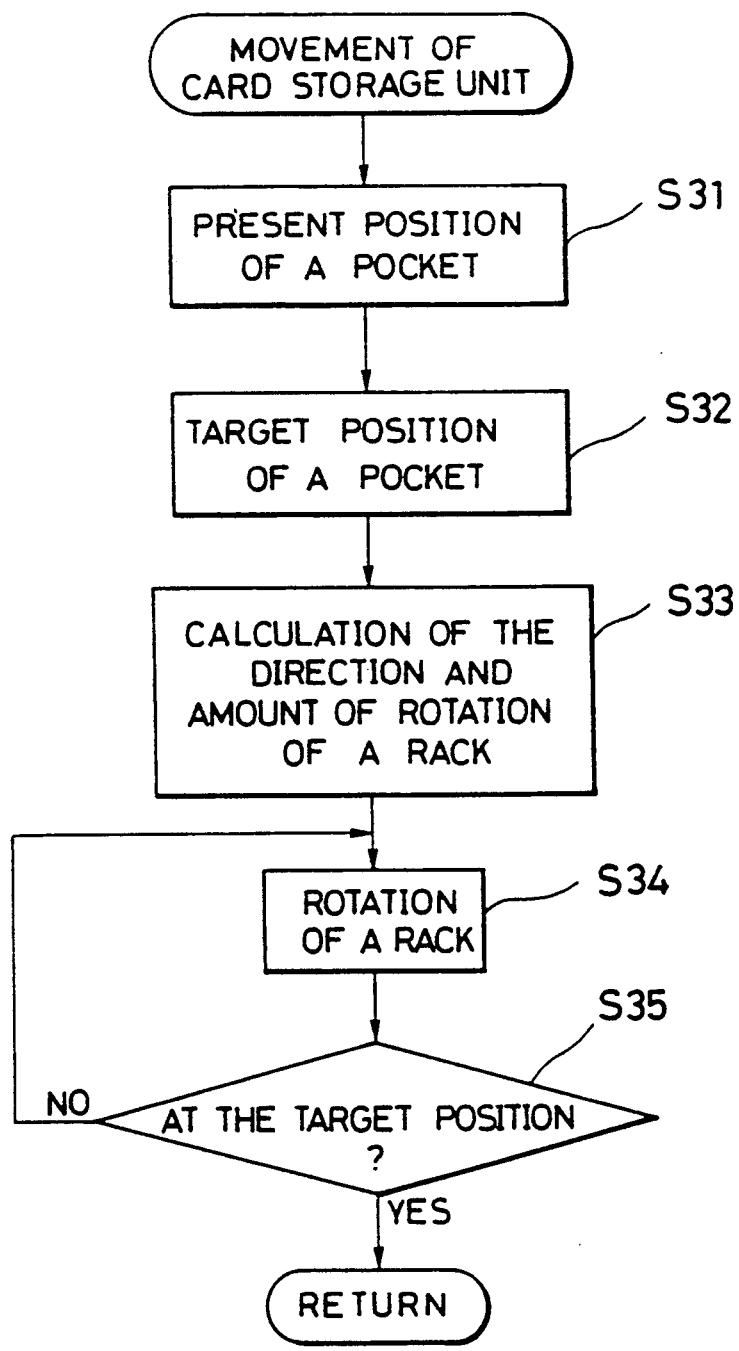
Figure 15C:
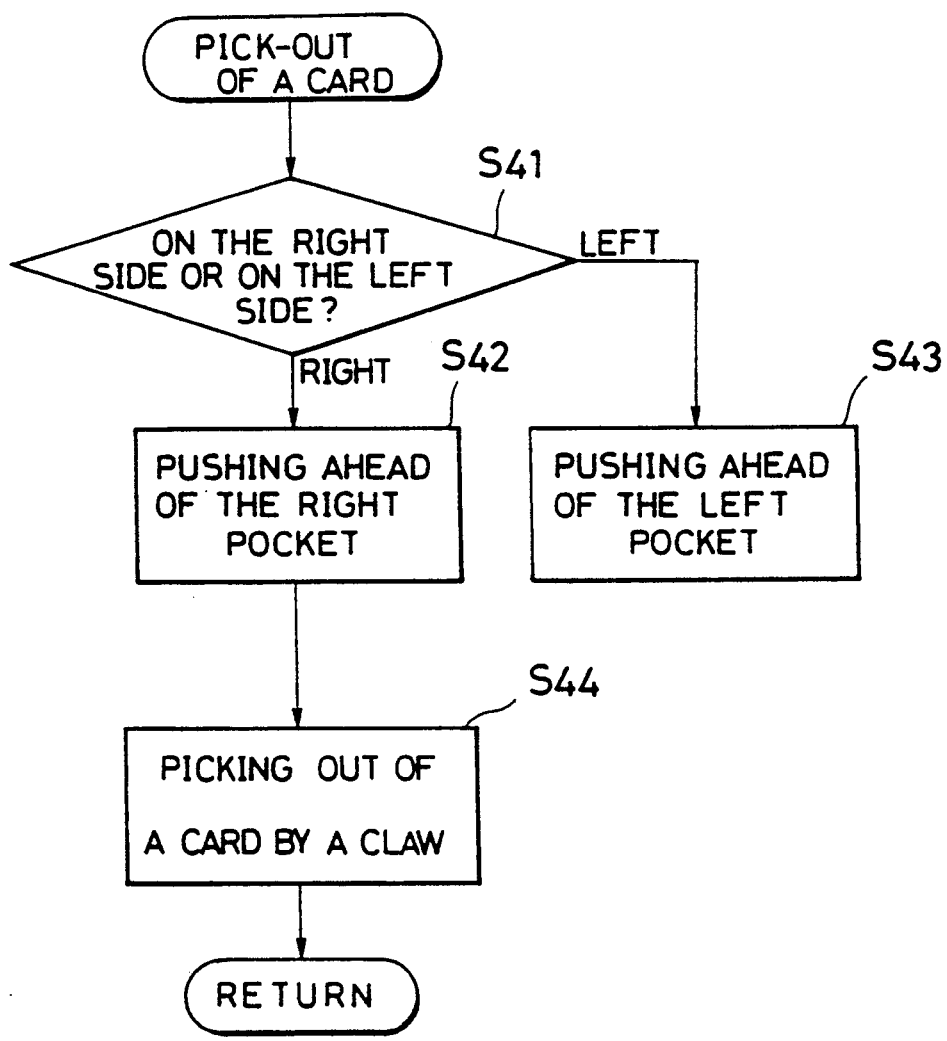
Figure 16:
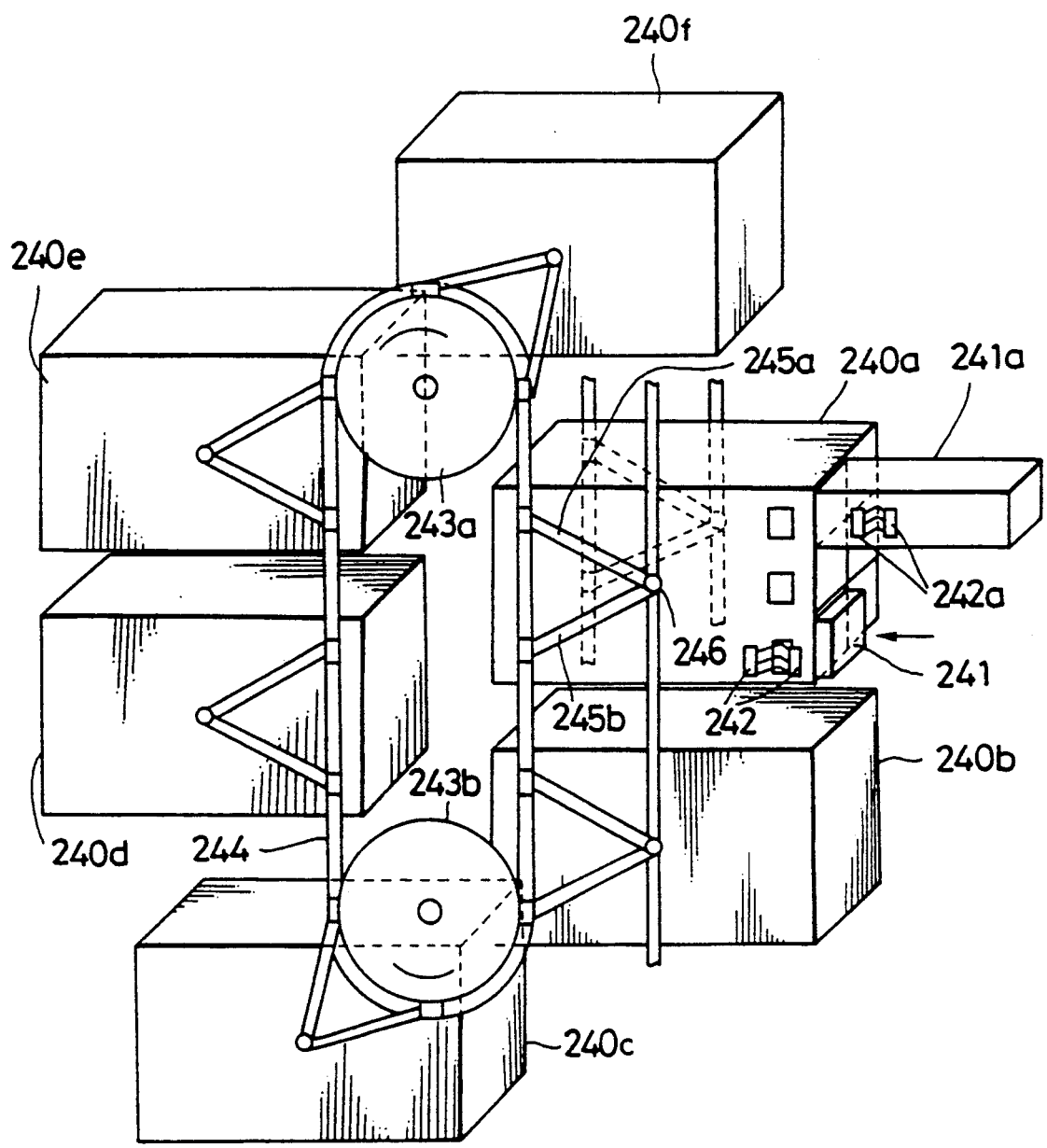
FIG. 16 shows a card storage unit employed in the second embodiment.

FIGS. 15 (a) to 15 (c) are flowcharts of the control procedures employed in the second embodiment. In the overall flow of the processings of this embodiment shown in FIG. 15 (a), the processings executed from step S3' to step S5' are different from those of the first embodiment shown in FIG. 4 (a). In the processing executed in step S2 in which the positional data is extracted, whereas the X and Y coordinates of a desired card container are extracted as the positional data in the first embodiment, the number of a rack which contains a desired card container and the position of the desired container in the rack are extracted in this embodiment. In the second embodiment, the card storage unit 201 incorporates six racks 240a to 240f, as shown in FIG. 16. Each of the racks contains 6 containers, which are arranged in two rows in the horizontal direction and in three rows in the vertical direction. The number of racks or the number of containers are not limited to those employed in this embodiment.

Subsequently, the card storage unit 201 is moved in step S3', and it is then determined in step S4, whether or not the card storage unit 201 is located at the correct position. If the card storage unit 201 is at the correct position, the processing proceeds to step S5' where a card is picked out from the card storage unit 201. Movement of the card storage unit 201 will be described in detail below with reference to FIG. 15 (b) which is a flowchart of the processings executed in steps S3' and S4' and FIG. 16 which shows the card storage unit 201.

First, in step S31, the container which is located at the card picking out unit is read by a sensor 242, and the position of the container in which a desired card is stored is then read in in step S32. Next, the direction and the amount of rotation of the racks 240a to 240f are calculated from the present position and the target position in step S33. Gears 243a and 243b are rotated by a motor (not shown) in accordance with the calculated values in step S34. Each of the racks 240a to 240f is supported on a rotatable shaft 246 by means of two arms 245a and 245b mounted on a chain 244 extending between the gears 243a and 243b. This structure enables the racks 240a to 240f to be rotated while being maintained horizontally, as shown in FIG. 16. For example, if the lower containers in the rack 240a are located at present at the card picking out unit and if a desired container is in the rack 240e, the racks are rotated in the rightward direction as viewed in FIG. 16. If a desired container is in the rack 240c, the racks are rotated in the leftward direction.

Next, it is determined in step S35 whether or not a desired rack is located at the target position by reading the code representing the container which is provided on the side of the rack by means of the sensor 242. Execution of the processings of Steps S34 and S35 is repeated until the rack stops at the target position. The racks are heavy in weight and it is therefore preferable from the viewpoint of reduction in the time required for the rack to be moved to the target position that the racks are moved roughly and finely by using different motors. The rough movement of the racks may be performed by controlling the amount of rotation of the gears 243a and 243b, whereas the fine movement may be performed by means of feedback control on the basis of the positional data which is obtained by means of the sensor 242.

Figure 17A:
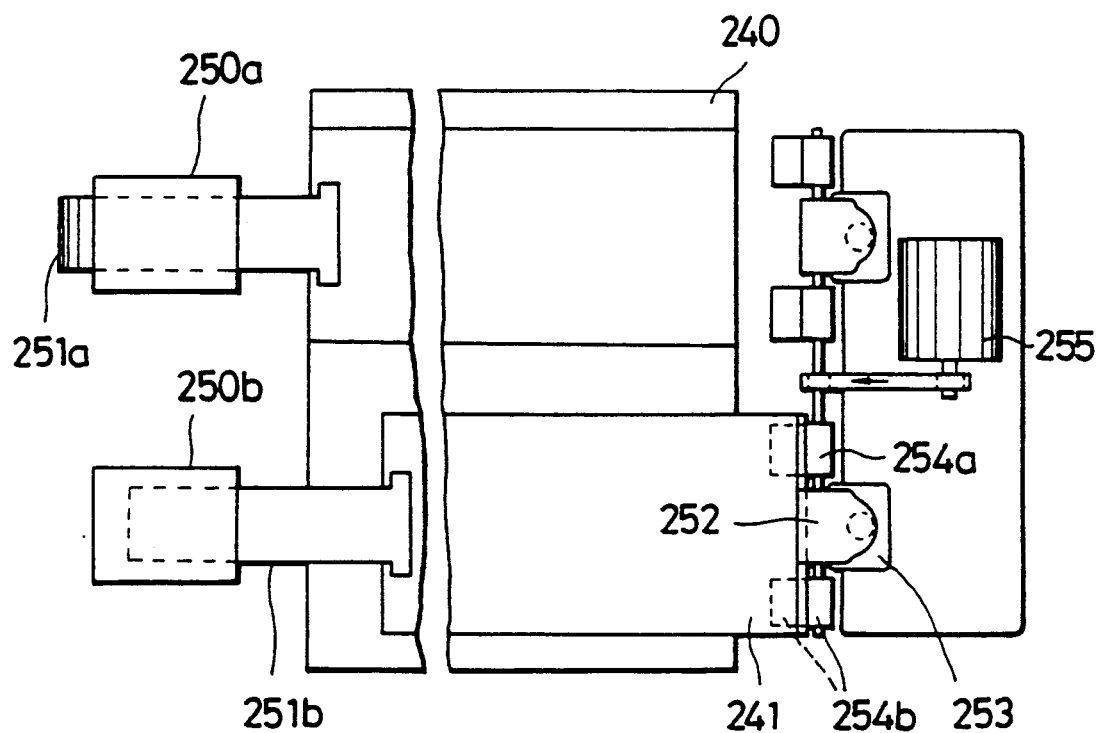
FIG. 17 (a) and 17 (b) show a card picking out unit employed in the second embodiment.
Figure 17B:
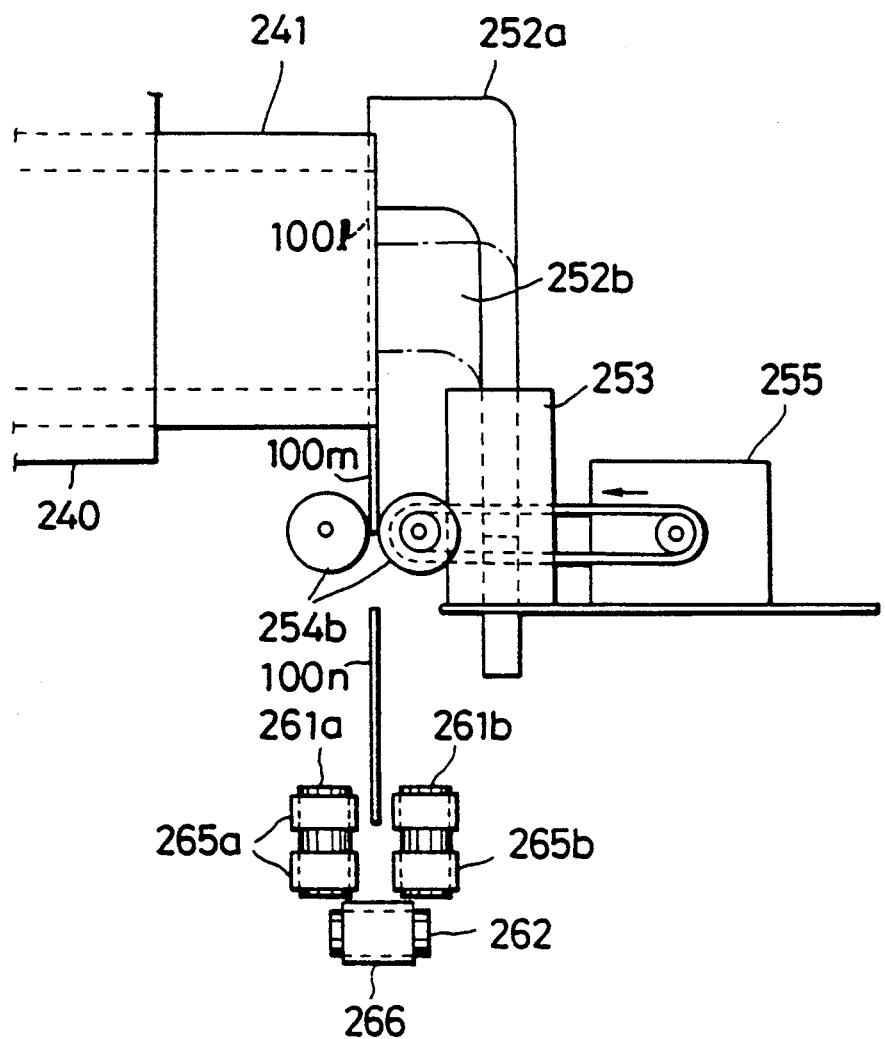

Once the rack stops at the target position, the processing in step S5' will be executed. Next, the procedure in step S5' will be described in detail with reference to FIG. 15 (c) which is a flowchart of the card picking out procedure and FIGS. 17 (a) and 17 (b) which respectively show the card picking out mechanism. First, it is determined in step S41 whether the target container is on the right or left side of the rack. If the target container is on the right side, the right container is pushed out to the card picking out mechanism which is located in front of the right container in step S42. If the target container is on the left side, the left container is pushed out in step S43. A pushing out mechanism includes solenoid coils 250a and 250b and rods 251a and 251b which slide along the coil axes to push out a container, as shown in FIG. 17 (a). FIG. 17 (a) shows a state in which the left container is being pushed out.

Next, in step S44, a card located at the forefront is picked out by a claw 252 which moves under the influence of the magnetic field generated by a solenoid coil 253, and the processing then returns. FIG. 17 (b) shows the operation of the card picking out mechanism. In FIG. 17 (b), a card 100 moves from the position indicated by a card 100l, to the position indicated by a card 100m and then to the position indicated by a card 100n. More specifically, as a claw 252a is moved downward with respect to the solenoid coil 253 to a position indicated by a claw 252b, one card 100l located at the forefront is pushed down to the position indicated by a card 100m. At that time, the forward end of the card 100m is gripped between rollers 254a and 254b rotated by a motor 255. The card 100m is then moved further downward, and is separated from the rollers 254a and 254b and falls, like the card 100n.

The card 100n which has been picked out is conveyed by a belt shown in FIGS. 18 (a) and 18 (b). The card 100n which has fallen from the card picking out mechanism is placed on a belt 266 rotated by rollers 262 and 264. A card 100p is conveyed from the position indicated by the card 100p, to the position indicated by a card 100q and then to the position indicated by a card 100r while being gripped between belts 265a and belts 265b which are respectively rotated parallel to the belt 266 by rollers 261a and 263a and rollers 261b and 263b. As will be seen in FIG. 18 (a), the belts 265a and the belts 265b are disposed in such a manner that the gap between the belts 265a and 265b is large at the left side thereof and is small at the right side as viewed in FIG. 18 (a). This enables the cards r to pass substantially at the same position, thereby eliminating discrimination errors in the card discriminating unit.

After a card has been picked out from the container, the container may be pushed out, like a right container 241a at the uppermost stage in the rack 240a in FIG. 16, so that the number of cards remaining in that container can be counted by a sensor 242a mounted on the upper or side surface of the rack for stock control.

In this embodiment, the card storage unit incorporates six racks, each of which contains six containers.

However, the number of racks and the number of containers can be varied in accordance with the application of the system.

Figure 11:
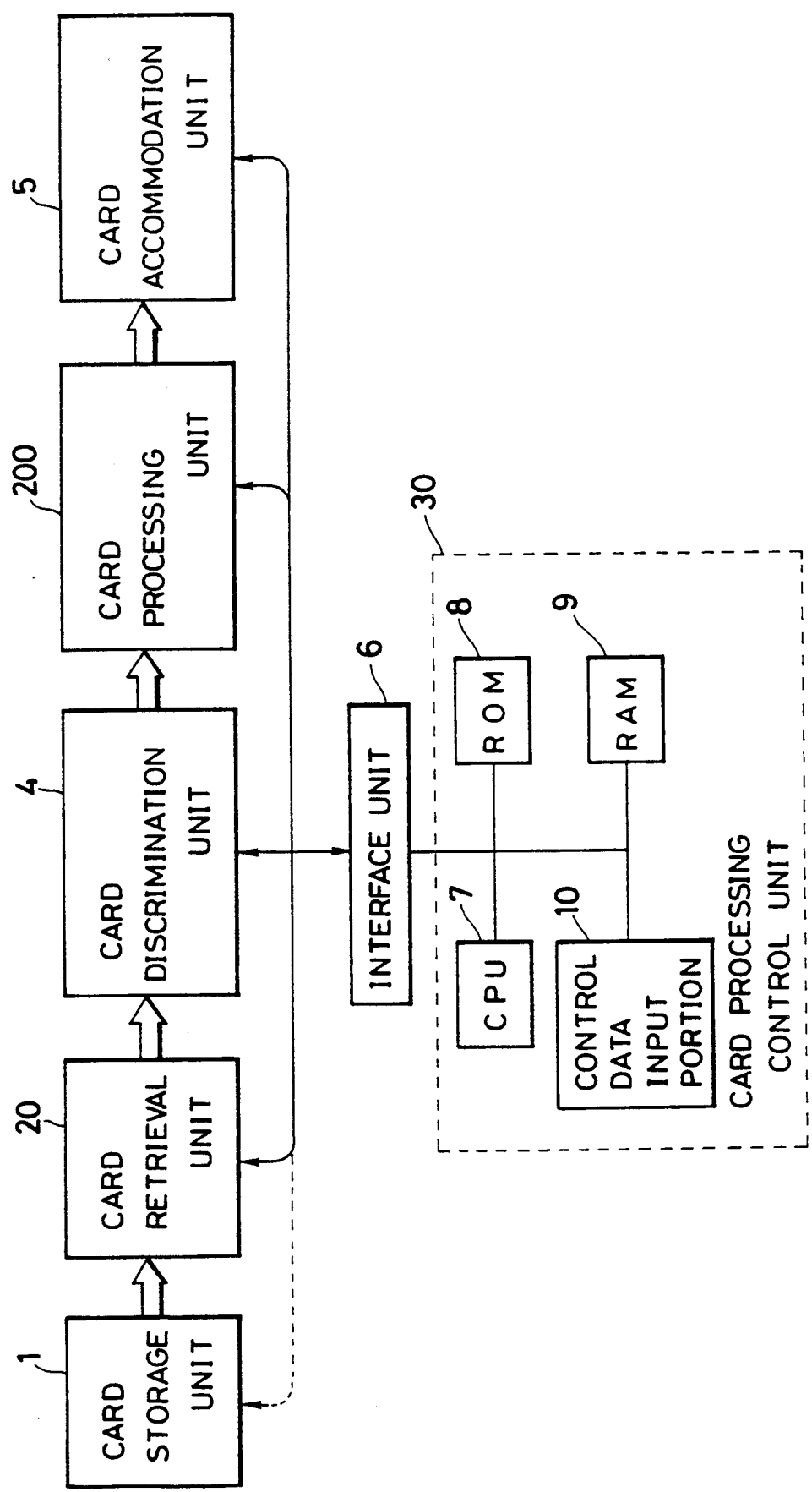
FIG. 11 is a block diagram of a card processing system which is a card accommodation system with a card machining system incorporated therein.
Figure 12:
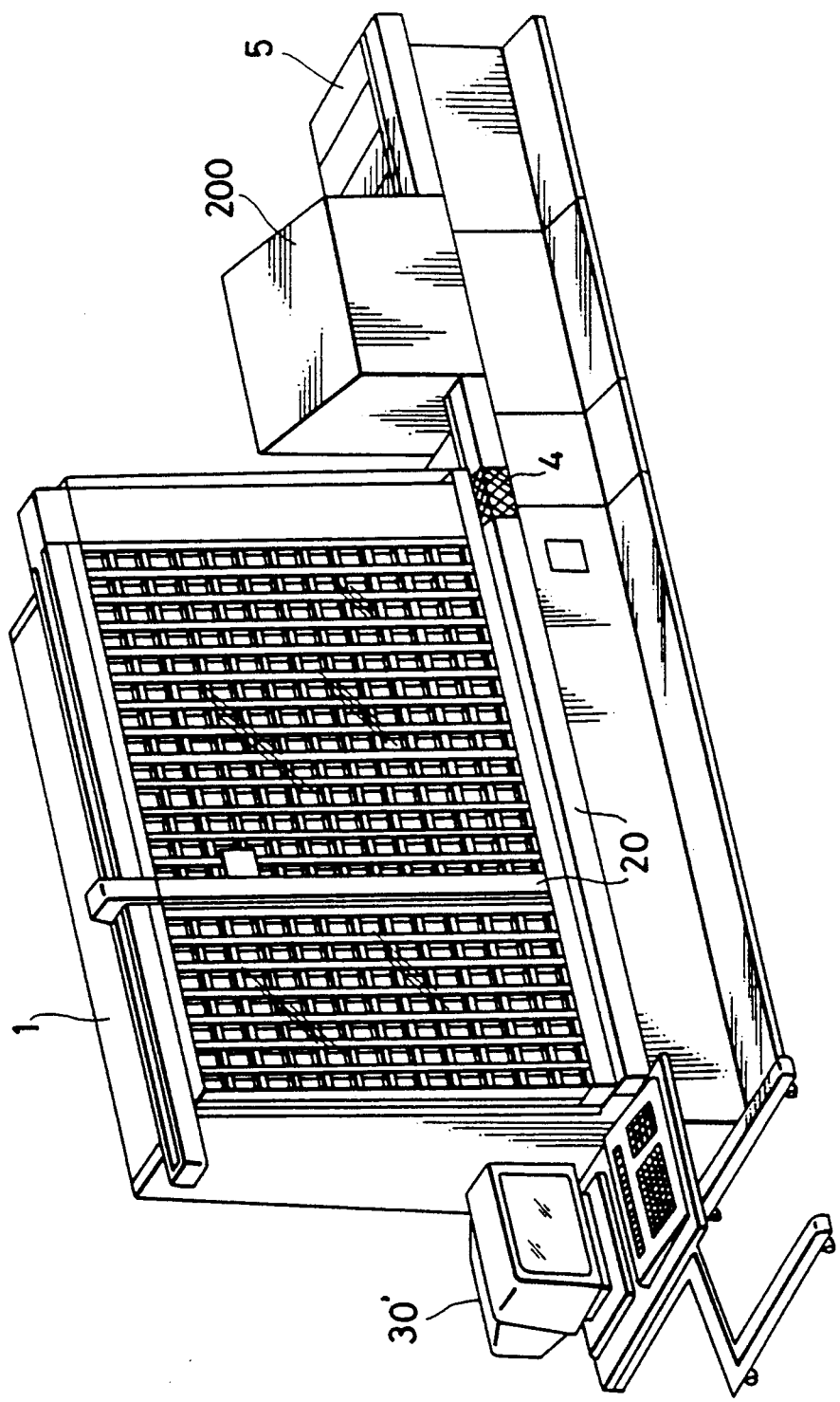
FIG. 12 is an external view of the card processing system of FIG. 11.

FIGS. 11 and 12 are respectively a block diagram and an external view of the card processing system which is the first embodiment of a card accommodation system with a card machining system incorporated therein. In this card processing system, a card processing unit 200 for embossing cards is interposed between the card discriminating unit 4 and the card accommodating unit 5, and both the card accommodation system and the card machining system are controlled by a card processing control unit 30'. One desired card is picked out from the card storage unit 1 by the card picking out unit 2, and the card which has been picked out is conveyed toward the card accommodation unit 5 by the card retrieval unit 3. During the conveyance, whether or not the card is a correct one is determined by the card discriminating unit 4. If the card is a correct one, it is sent to the card processing unit 200. If not, the card is rejected as an erroneous card. In that case, another card may be picked out, or alternatively, the operation of the system may be stopped. After the completion of processing, the card is accommodated in the card accommodation unit 5.

The card processing control unit 30' controls through the interface unit 6 the card processing unit 200, in addition to the card picking out unit 2, the card retrieval unit 3, the card discrimination unit 4 and the card accommodation unit 5. The card processing control unit 30' includes the CPU 7 for processing/operating data, the ROM 8 for storing programs, the RAM 9 serving as the auxiliary storage means, and the control data input portion 10 for inputting control data, e.g., the order in which cards are machined, the number of individual cards and so on. In this card processing system, the card accommodation system and the card processing system can be integrally controlled by the card processing control unit 30', thereby reducing the time required for processing a card, preventing errors, and enabling inclusive processing of cards.

A display lamp may be provided for each container to indicate that no card is left in that container. A full indicating lamp may also be provided.

Third Embodiment

Figure 19:
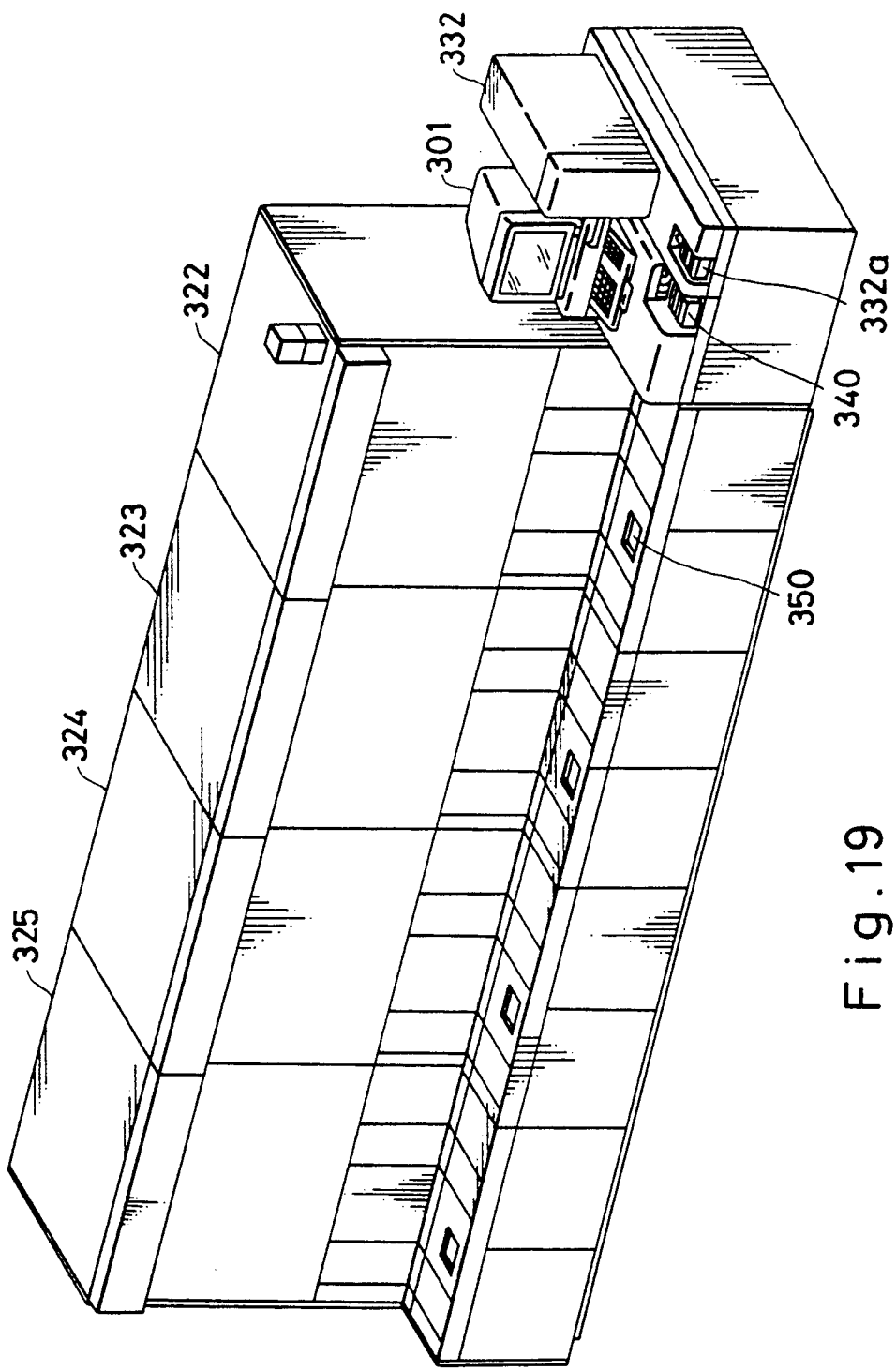
FIG. 19 is an external view of a card accommodation system, showing a third embodiment of the present invention.

FIG. 19 is an external view of a third embodiment of a card accommodation system. In FIG. 19, system control/management is performed through a personal computer 301. The card accommodation system incorporates four trunk units 322 to 325, each of which contains two racks. Each of the racks accommodates 32 pockets, each of which stores a maximum of 500 cards. The trunk units 322 to 325 are respectively provided with control sections 322a to 325a for controlling the rotation of the racks and the pick-out of the cards. An operation panel 350 is provided for each trunk unit for local operations. An accept stacker 332 accommodates four pockets, each of which is capable of storing up to 500 cards. A card which is rejected by means of image processing is accommodated in a reject stacker 332a. Separator cards used to separate the cards by type are stored in a separator card hopper 340.

Figure 20:
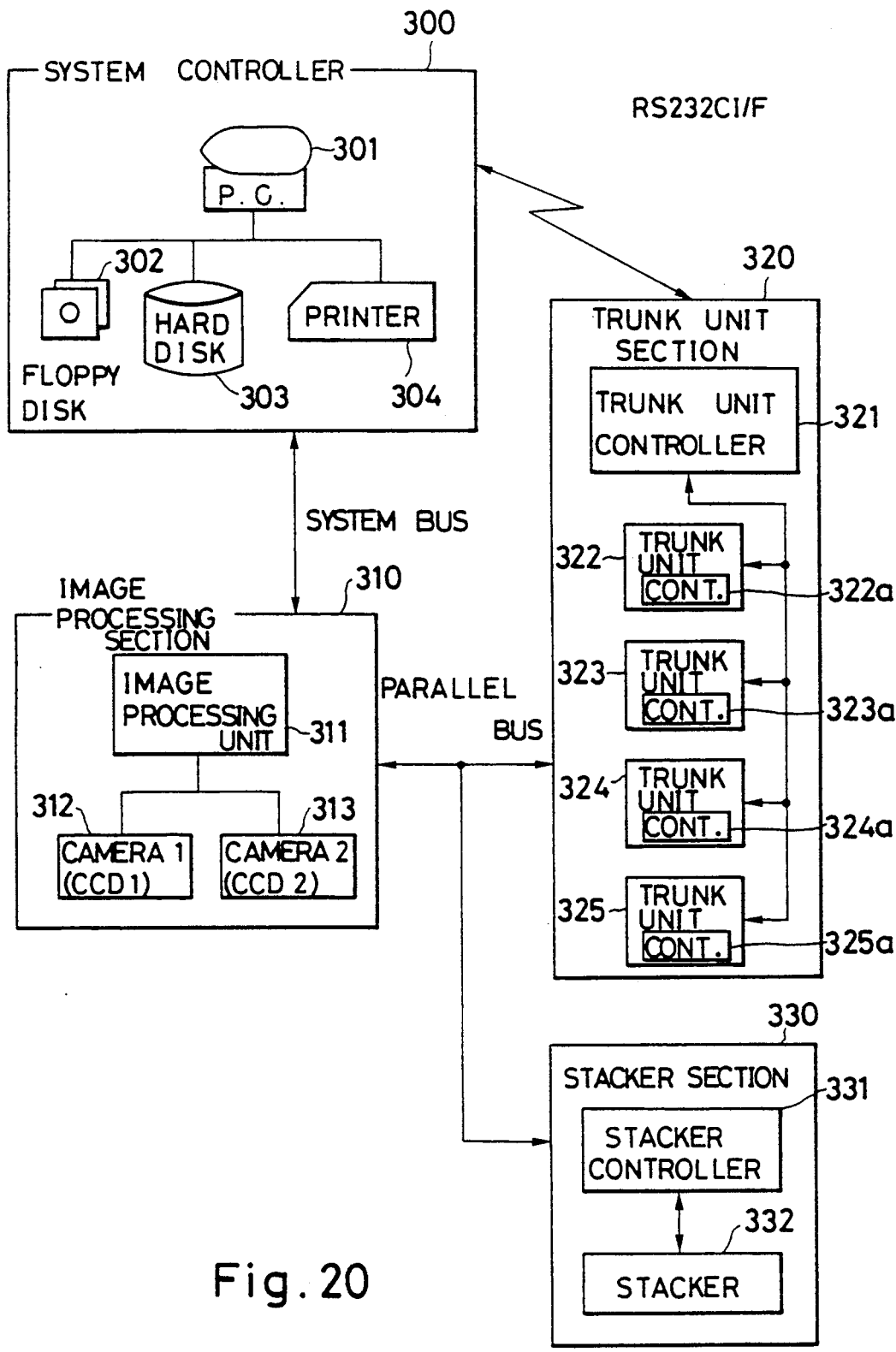
FIG. 20 shows the system configuration of the third embodiment of the card accommodation system in a practical form.

FIG. 20 shows the system configuration of the third embodiment in a practical form. A system controller 300 includes a personal computer (PC) 301, a floppy disk 302 from which the card extraction information which has been created beforehand in the order to be machined is loaded into the system, a hard disk 303 for storing programs, image data, and so on, and a printer 304 for outputting the results of the processing, a stock control list or the like. The PC 301 of the system controller 300 exchanges image data with an image processing unit 311 of an image processing section 310 over a system bus. It also exchanges data with a trunk unit controller 321 of a trunk unit section 320 through a communication cable (RS232CI/F) for the purpose of transmitting instructions to the trunk unit section 320.

The image processing section 310 includes the image processing unit 311 for performing image discrimination, and cameras (CCDs) 312 and 313 for respectively inputting the images of the front and rear surfaces of a card. The image processing unit 311 of the image processing section 310 exchanges data with the trunk unit controller 321 of the trunk unit section 320 and a stacker controller 331 of a stacker section 330 through a parallel bus for the purpose of accommodating a card which is rejected in the image discrimination in the reject stacker 332a. The trunk unit section 320 includes the trunk unit controller 321 for controlling the individual control sections 322a to 325a of the trunk units 322 to 325 through a communication cable (RS422), and the trunk units 322 and 325 having the aforementioned capacity. The number of trunk units is not limited to four. The stacker section 330 includes the stacker controller 331 and the stacker 332 with four pockets, each of which accommodates up to 500 cards.

Figure 21:
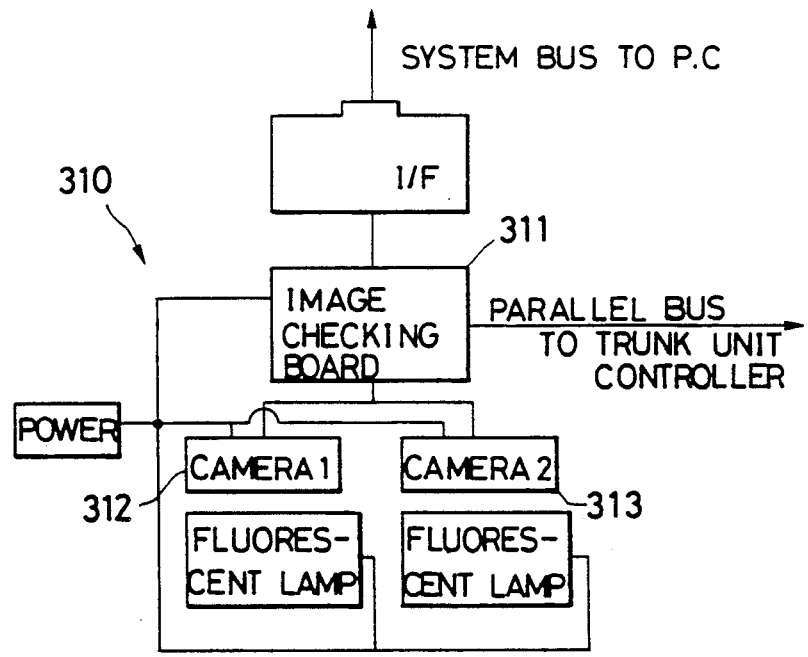
FIG. 21 shows an image processing section.
Figure 22:
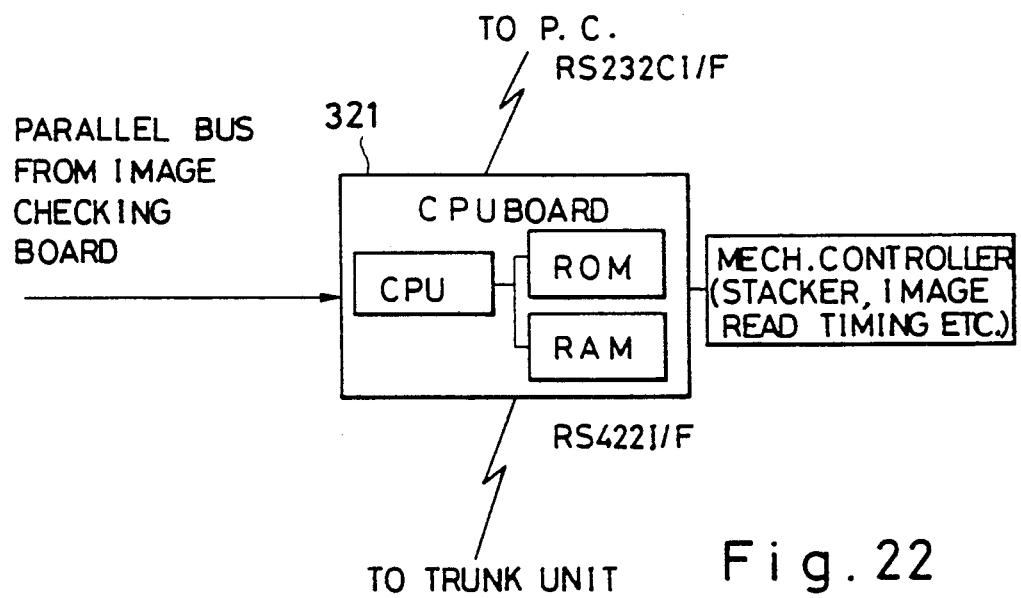
FIG. 22 shows a trunk unit controller.
Figure 23A:
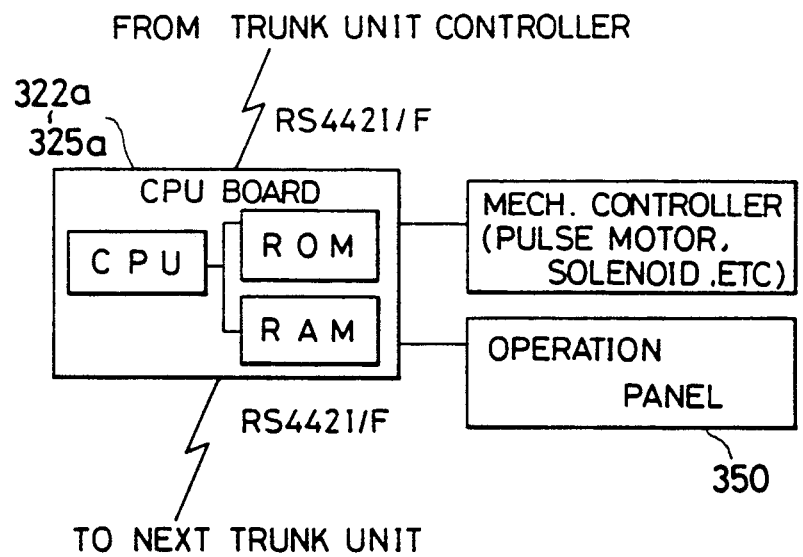
FIG. 23 (a) shows a trunk unit control portion.
Figure 23B:
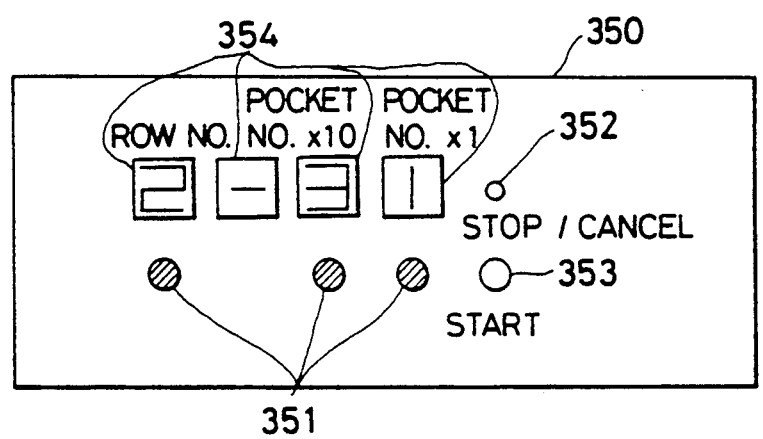

FIG. 21 shows the configuration of the image processing section, FIG. 22 shows the configuration of the trunk unit controller, and FIGS. 23 (a) and (b) show the configuration of the trunk unit control portion. As can be seen from FIG. 22, in this embodiment, the trunk unit controller 321 also acts as the stacker controller 331, and thus exerts overall control over the transport module. The control operation carried out in the trunk unit is divided into the rotation of the individual 32 pockets in the card rack to a card pick-out port, and the pick out of cards. These controls are performed on an on-line basis through the trunk unit controller 321. Local control of the trunk unit through the operation panel 350 provided at the front of each of the trunk units is also possible. As shown in FIG. 23 (b), the operation panel 350 has a display device 354 which displays a row No. and the tens digit and the units digit of a pocket No., an increment switch 351, a stop/release switch 352 of the trunk unit, and a start key 353 which is to be pressed to move the card pocket indicated by the row No. and the pocket No. to the manual card pick-out port. Each rack has its own row No., with the rack located closest to the stacker section 330 having 1, the second closest one having 2, and so on. Thus, each of the trunk units incorporates the two racks having different row Nos.

The operation panel 350 allows cards to be supplied into the pocket or to be manually picked out from the pocket in an emergency case. It also enables operations required for repair to be performed smoothly.

Figure 24:
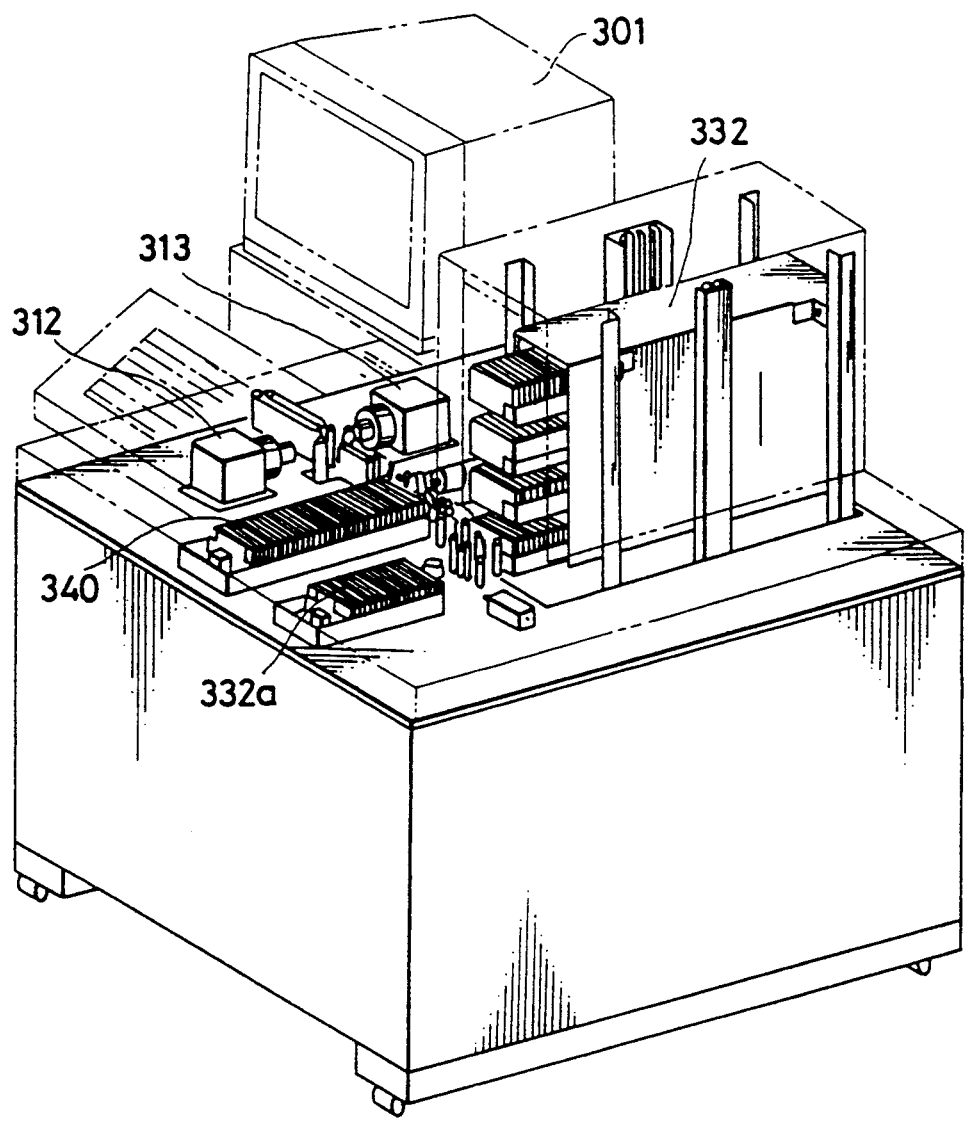
FIG. 24 shows a stacker section in detail.

FIG. 24 shows the stacker section 330 in detail. The accept stacker 332 has four pockets each of which accommodates up to 500 cards. The pockets are aligned in the vertical direction. Cards are accommodated first in the uppermost pocket, then the second uppermost pocket and so on. Once one of the pockets has been filled with cards, it is shifted upward by one stage. FIG. 24 also shows the reject stacker 332a, the separator card hopper 340 which can contain up to 300 cards, and the image readers (CCD cameras) 312 and 313.

Figure 25A:
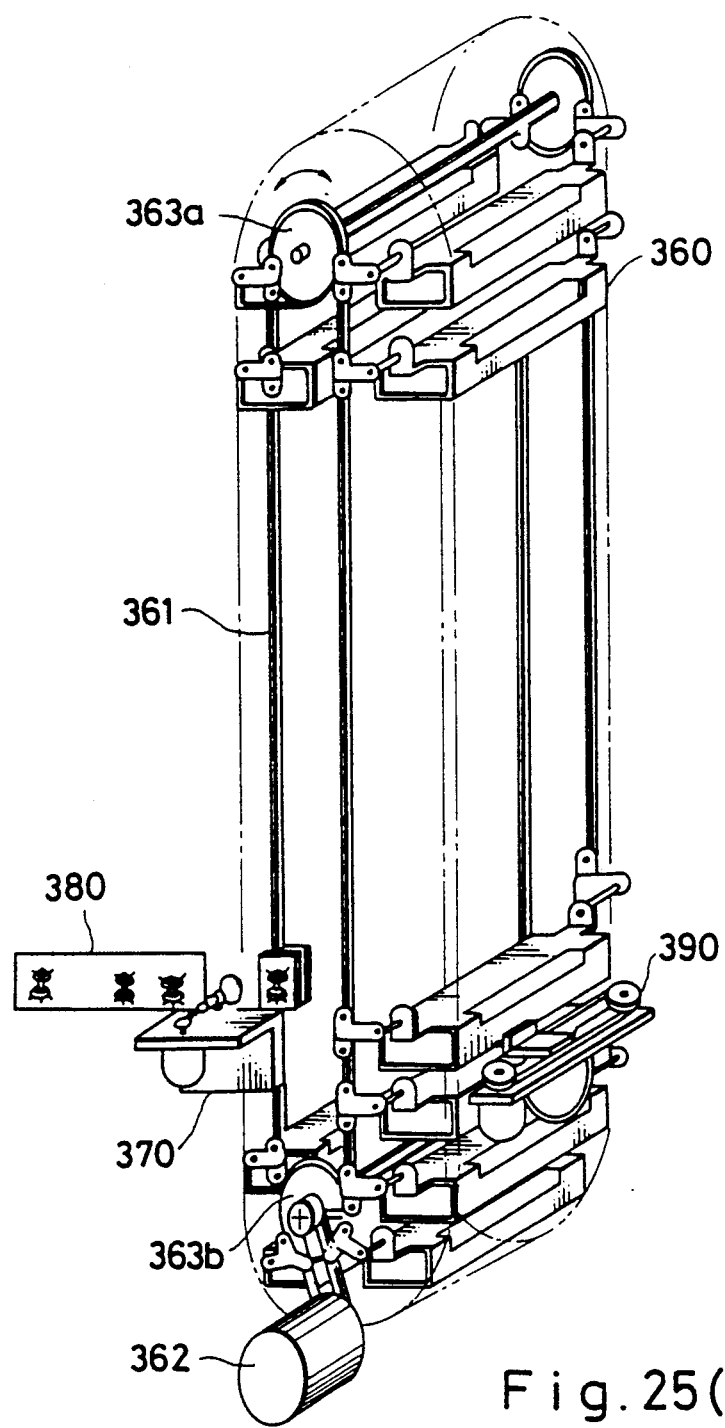
FIG. 25 (a) shows a mechanism for moving a card pocket.
Figures 25B, 25C:
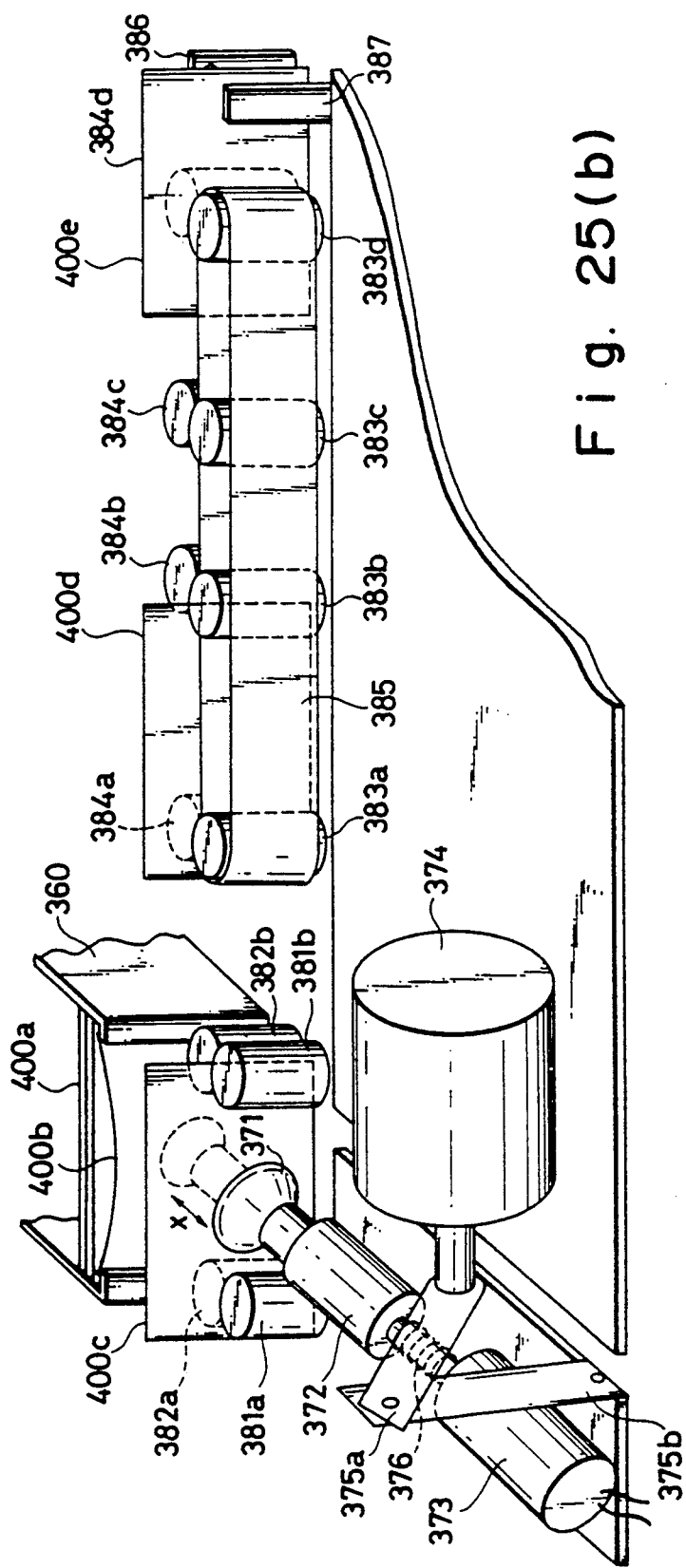

FIG. 25 (a) shows a card rack mechanism in the trunk unit which incorporates two card racks. The card rack accommodates 32 card pockets 360. The card pockets 360 are rotated by means of gears 363a and 363b driven by a motor as well as a chain 361, so that a desired card pocket 360 can be brought to a card pick out module 370 where a card is picked out from that card pocket. The card which has been picked out is conveyed by means of a transport module 380.

As shown in FIG. 25 (c), the desired card pocket 360 is positioned at the card pick out module 370 by means of code plates 364a to 364c, and lamps 365a to 365c and photo sensors 366a to 366c for sensing holes formed in the code plates 364a to 364c as the address (e.g., binary codes from 00000 to 11111) of the card pocket. The code plates, the lamps and the photo sensors are mounted on the side of each of the card pockets 360. In this embodiment, the rack is rotated in either direction according to the difference between the present position and a subsequent position so as to reduce the time required to position the desired card pocket at the card pick out module. To achieve this, the code plates 364a have binary codes that increase in one direction, which are used for rightward rotation, and the code plates 364b have binary codes that increase in the other direction, which are used for leftward rotation. The code plates 364c are reserves. Furthermore, the present embodiment includes a card counter 390 for counting the number of cards within the card pocket 360 for stock control by receiving light reflected by the edges of the cards. It is therefore possible to check the remaining number of cards within the overall pockets before the operation of the system starts.

Next, the operation of the card pick out module 370 and that of the transport module 380 will be described in detail with reference to FIG. 25 (b). A card 400a accommodated in the card pocket 360 is picked out by a card affixer which is moved back and forth in the direction indicated by X by a motor 374 through driving arms 375a and 375b. When the card 400a is picked out, it is curved, like a card 400b, so as to prevent the sticking of one card to another resulting in the extraction of two cards at one time, which may be caused due to static electricity or the like. The card affixer is composed of a sucker 371, a body 372 with a valve for controlling the cut off/introduction of air incorporated therein, and an electromagnetic solenoid 373 for driving the valve such that it introduces air only when a card is brought into the transport module, i.e., only when the card is located at a position indicated by a card 400c. The card which has been affixed by the card affixer is handed over to the card transport module 380.

The card is transferred from the card affixer to the card transport module 380 through rollers 381a and 381b and rollers 382a and 382b. The rollers 382a and 282b fall toward the card pocket when the card is picked out so as not to interfere with the pick-out operation of the card. In the transport module 380, the card is gripped between a belt extending along rollers 383a to 383d and rollers 384a to 384d and is conveyed out of the trunk unit in that state. The transport modules of the individual trunk units are connected one after another, so that the card can be conveyed past the common transport modules. To avoid collision of cards or confusion of a card sequence in the transport modules 380, the trunk unit controller 321 controls start/stop of the rollers 383a to 383d in the manner to be described below using a card sensor, which is comprised of a lamp 387 and a photo sensor 386 and which is provided at the end of the transport module 380 of each of the card racks.

Figure 26:
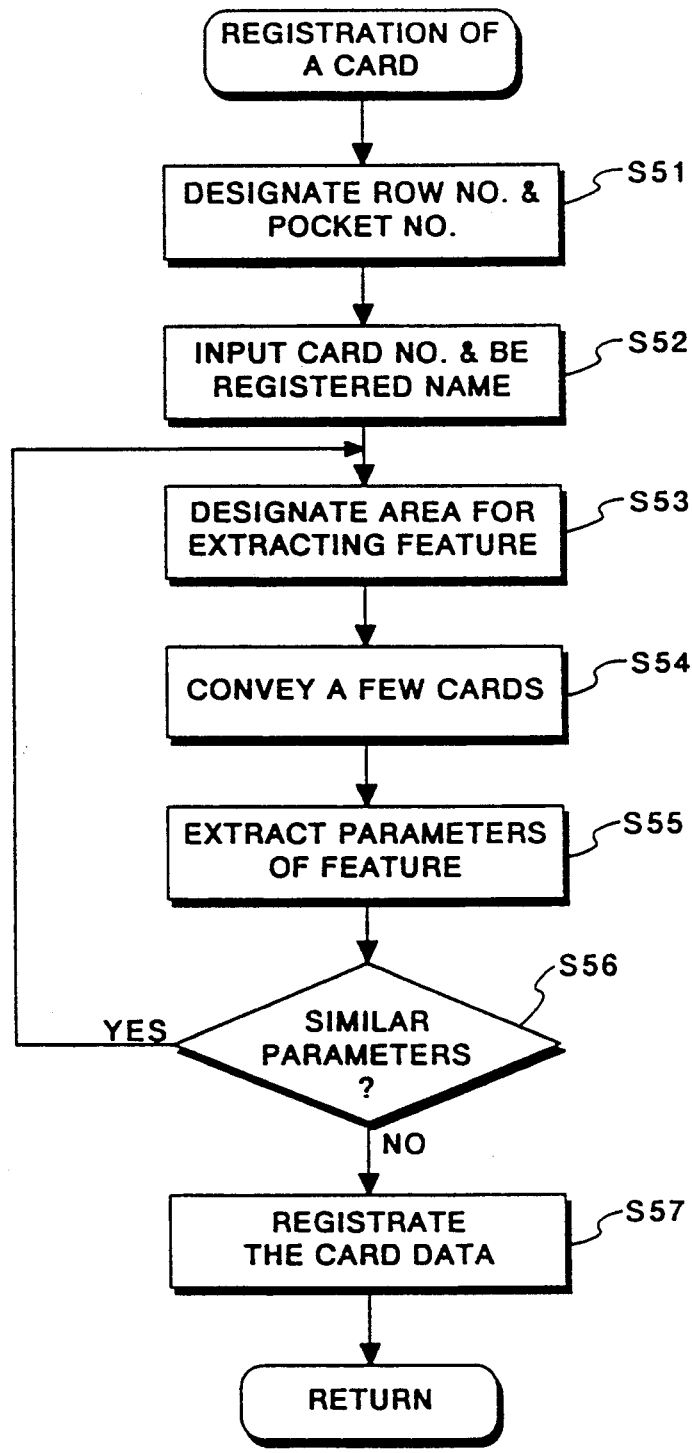
FIG. 26 is a flowchart of the processing procedures carried out by a system controller to register a card.
Figure 27:
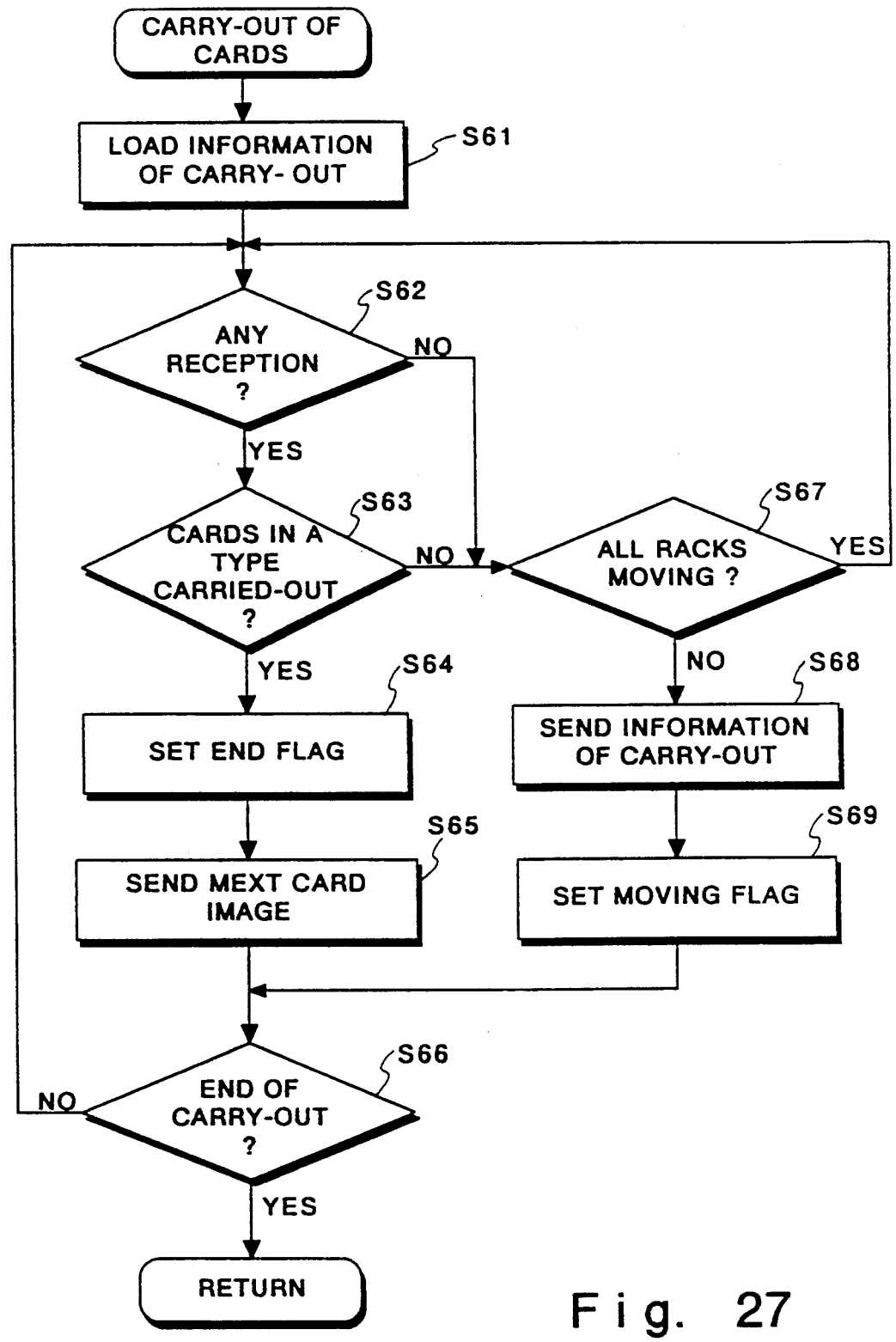
FIG. 27 is a flowchart of the processing procedures carried out by the system controller to extract a card in the third embodiment.

FIGS. 26 and 27 are flowcharts of the control procedures to be carried out by the card accommodation system. The control procedures of this system are divided into the card registration processing executed prior to the extraction of cards to register cards, and the card extraction processing executed to actually extract cards. In the card registration processing, each card pocket position is registered with on type of card stored in the card pocket and the feature pattern of the card. The cards which have been registered are treated using the number representing the type thereof. In the card extraction processing, desired numbers of desired types of cards are picked out from the corresponding card pockets on the basis of the card extraction information created beforehand with a subsequent card machining process taken into consideration, and the cards which have been picked out are compared with the feature patterns registered by the image processing section so as to check the correctness of the cards, the accepted cards being then accommodated in the accept stacker in the order to be machined in the subsequent machining process.

FIG. 26 is a flowchart of the processing procedures which are carried out by the system controller to register cards. An operator inputs information required interactively through the personal computer (PC) 301.

First, the card No. and the registration name (an abbreviation of the card name) are input in step S52. Next, in step S53, the feature extraction area of the cards is designated. In a case where no area is designated, a default area is forcibly set. Once the feature extraction area has been designated, the registered card which has been stored beforehand in a pocket having a certain number in a row having a certain number (e.g., in the 1st pocket in the 1st row) is picked out in step S54, and the feature parameter of the card picked out is then extracted by the image processing section 310 in step S55. Thereafter, in step S56, it is determined whether or not a parameter similar to the extracted feature parameter has been already registered. If the answer is yes, there is the possibility of check error of the image processing section 310. In consequence, the processing returns to step S53 and extraction of the feature parameter is carried out again using a different feature extraction area. If a parameter clearly representing a feature is obtained in step S56, the processing goes to step S57 where the card information is registered.

Next, the card extraction processing will be described below with reference to the flowcharts shown in FIGS. 27 to 29. FIG. 27 is a flowchart of the processing procedures which are carried out by the system controller for the extraction of cards.

First, in step S61, extraction information is loaded. In this embodiment, the extraction information is loaded from the floppy disk 302. Next, it is determined in step S62 whether or not there is any reception from the trunk unit controller 321. If there is no reception, it is determined in step S67 whether or not all the racks are in operation. If there is a rack which is not in operation, the oldest extraction information on that rack is transmitted in step S68. Thereafter, in step S69, a flag indicating that the extraction information is being executed is set on that extraction information. If all the racks are in operation, the processing returns to step S62.

If it is determined in step S62 that a signal has been received from the trunk unit controller 321, it is determined in step S63 whether or not the signal received represents the completion of extraction of one type of card. If the answer is affirmative, a flag indicating that execution of the extraction information has been completed is set on the relevant extraction information in step S64. Subsequently, in step S65, the feature parameter of the type of card to be extracted subsequently is output to the image processing section 310. In step S66, it is determined whether or not all the extraction processes have been completed. If the answer is no, the processing returns to step S62.

Figure 28A:
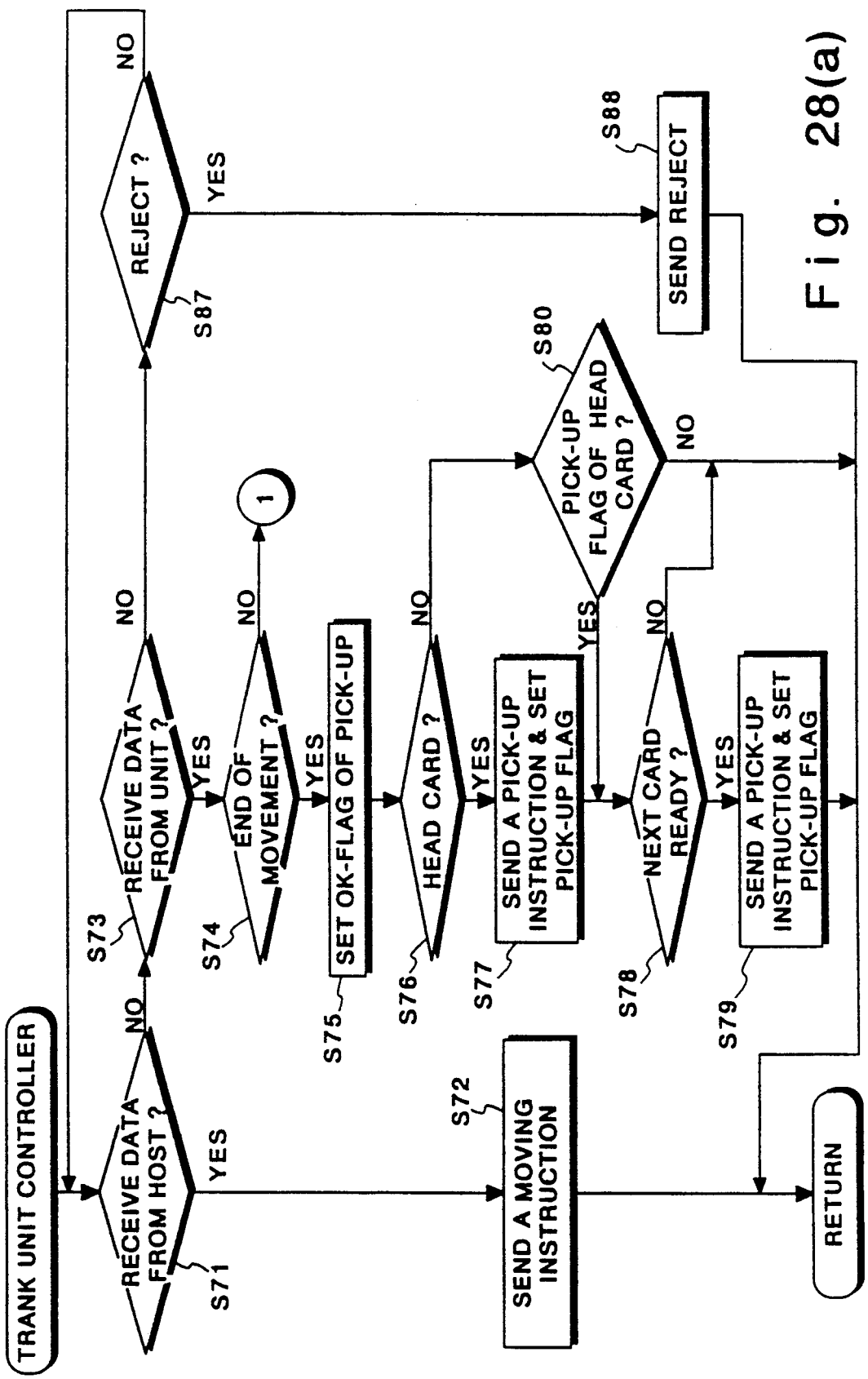
FIGS. 28 (a), (b) is a flowchart of the processing procedures carried out by the trunk unit controller to extract a card in the third embodiment.
Figure 28B:
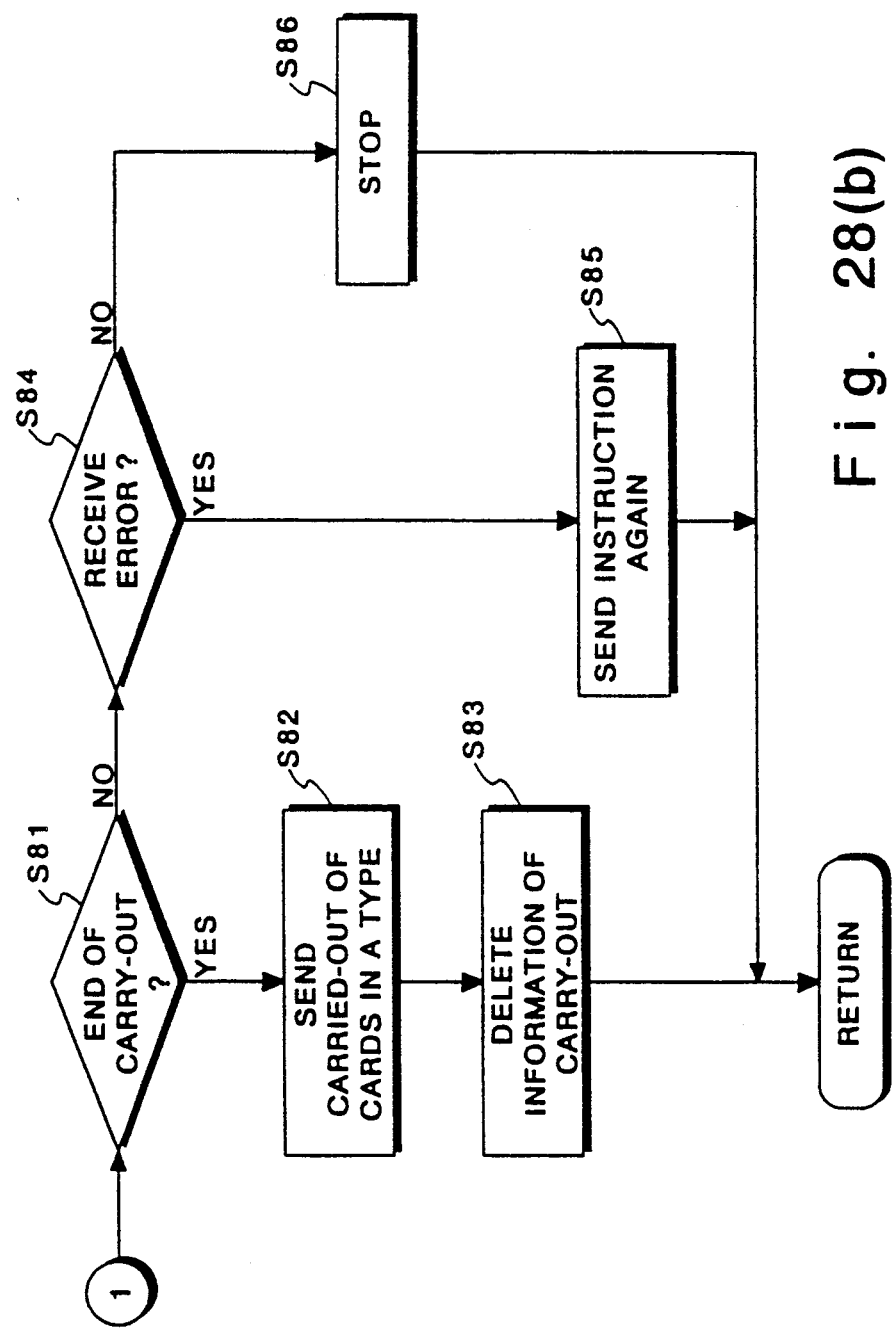

FIGS. 28 (a), (b) is a flowchart of the processing procedures which are carried out by the trunk unit controller to extract cards.

First, it is determined in step S71 whether or not there is any reception of the extraction information from the system controller 300, it is determined in step S73 whether or not there is any reply from any of the trunk units 322 to 325, or in step S84 whether or not there is any reception of data representing the rejection of a card from the image processing section 310. If it is determined that the extraction information has been received from the host, the processing goes to step S72 where the card rack moving instruction is transmitted to the corresponding trunk unit. If the reject data has been received, the trunk unit controller 321 informs the corresponding trunk unit of the rejection of the card.

If the data is received from the trunk unit, it is determined in step S74 whether or not the movement of the rack has been completed, it is determined in step S81 whether or not the required number of cards have been picked out, or it is determined in step S84 whether or not there is any reception error. If the movement of the rack has been completed, a flag indicating that the rack is ready for pick-out operation is set in step S75. Thereafter, in step S76, it is determined whether or not the card is the forefront one among the cards which are ready to be picked out. If the answer is affirmative, a card pick-out instruction is output and a flag indicating that the card is being picked out is set in step S77. On the other hand, if the card is not the forefront one, it is determined in step S80 whether or not the flag indicating that the card is being picked out is set. If there is no flag, the processing returns. If it is determined in step S80 that the flag has been set, or after the forefront card pick-out instruction has been output in step S77, it is determined in step S78 whether or not a flag indicating that the rack is ready for a subsequent card pick-up operation is set. If the flag is set, the card pick-out instruction is output for the subsequent card and a flag that the card is being picked out is set in step S79.

If it is determined that the normal extraction has been completed the trunk unit controller 321 informs the host, the system controller 300, that the extraction of one type of card has been completed in step S82. Thereafter, in step S83, the corresponding extraction information in the trunk unit controller 321 is deleted. If it is determined in step S84 that there is reception error, the instruction is sent again in step S85. If it is determined in step S84 that there is no reception error, the reply from the trunk unit is abnormal, and the operation of the corresponding trunk unit or that of the corresponding control portion is stopped in step S86.

Figure 29:
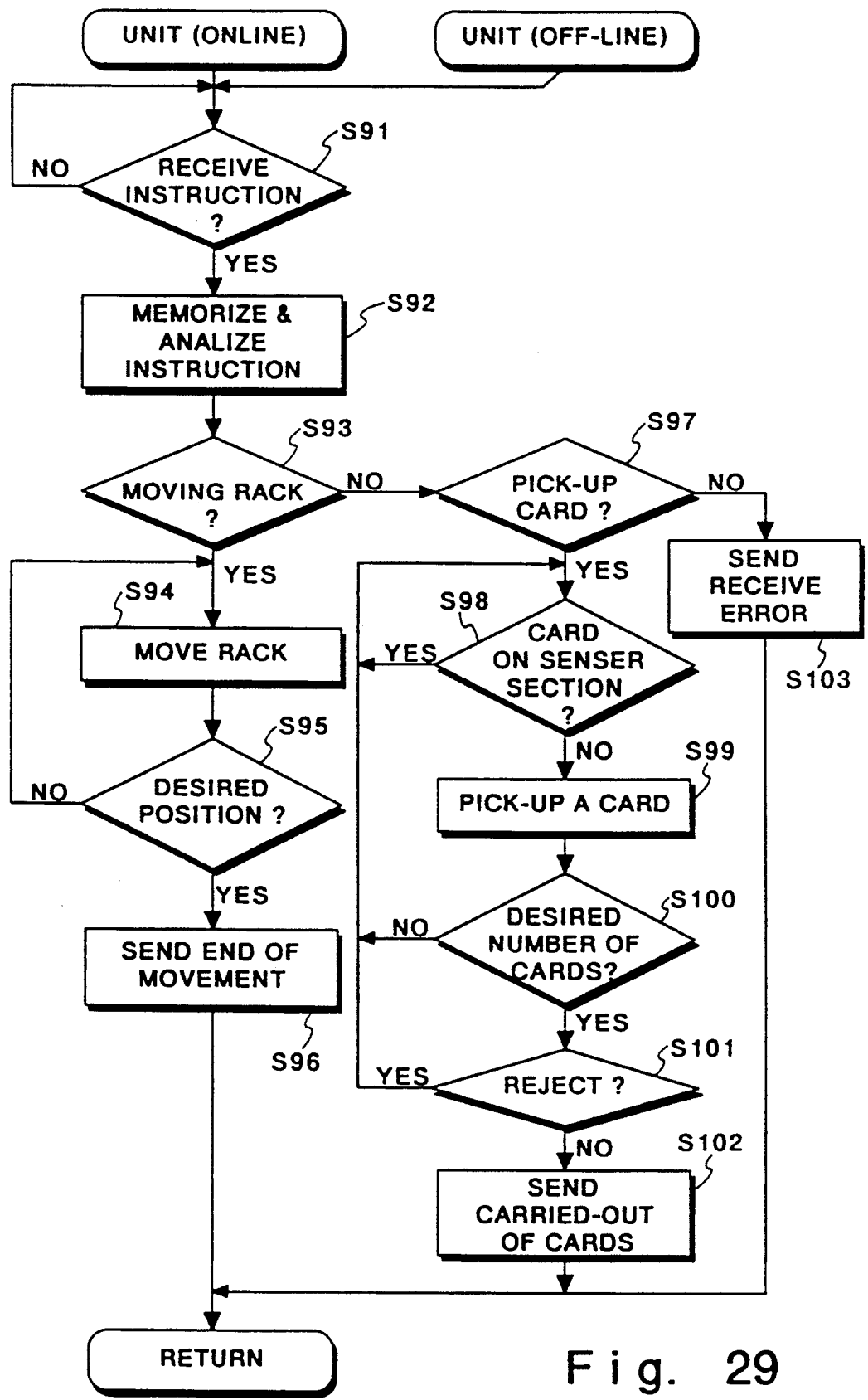
FIG. 29 is a flowchart of the processing procedures carried out by the trunk unit to extract a card in the third embodiment.

FIG. 29 is a flowchart of the processing procedures which are carried out by the trunk unit to extract cards. The same processing procedures are carried out in a case where instructions are input from the operation panel.

First, in step S91, an instruction from the trunk unit controller 321 is awaited. If any instruction is received, the instruction is memorized and analyzed in step S92. Thereafter, it is determined in step S93 whether or not the results of the analysis represents the card rack movement instruction, or it is determined in step S94 whether or not the results of the analysis is the card pick-out instruction. If the card rack movement is instructed, movement of the designated card pocket to the card pick out port is started in step S94. Execution of the processings in steps S94 and 95 is repeated until it is determined in step S95 that the desired pocket has reached the card pick out port. Once the desired pocket has reached the desired position, the trunk unit control portion informs the trunk unit controller 321 in step S96 that the movement of the rack has been completed.

If the card pick out is instructed, it is determined in step S98 whether or not there exists a card at the sensor portion (between the lamp 386 and the photo sensor 387 shown in FIG. 25 (b)). If the answer is yes, the card pick out operation is not carried out. If there exists no card in the sensor portion, one card is picked out and fed to the transport module 390 in step S99. Thereafter, it is determined in step S100 whether or not a designated number of cards have been extracted. If the answer is negative, the processing returns to step S98 and the card pick-out operation is carried out. Once the designated number of cards have been extracted, it is determined in step S101 whether or not there is a rejected card. If there is a rejected card, the processing returns to step S98 and the number of cards corresponding to the number of cards rejected is picked out again. Once the designated number of cards have been extracted without rejection, the trunk unit control portion informs the trunk unit controller 321 that the extraction of one type of card has been completed. The instruction which is neither the card rack movement nor the card pick out is reception error. In consequence, in step S103, reception error is transmitted to the trunk unit controller 321.

Rejection of cards may be processed such that the occurrence thereof is informed to the system controller 300 but that no card is picked out. Although insertion of the separator cards has not been explained in detail, they may be inserted during, for example, the transfer of the card image. Furthermore, control of the accept stacker 332 and the accommodation of cards into the reject stacker 332a are obvious. Further, although stock control by means of the card counter 390 and the output of data to the printer have not been detailed, the functions possessed by a normal personal computer make these controls possible.

A system formed by combining the first, second and third embodiments may also be possible. In such a system of the type in which the containers are aligned in the horizontal direction, a desired container may be moved to the target position in the vertical direction by rotating racks, and be reached in the horizontal direction by moving the card picking out unit in the horizontal direction.

It is to be understood that changes and additions may be made without departing from the spirit and scope of the invention as set forth in the appended claims.

What is claimed is:

1. A card trunk system comprising:
   card storage means for storing a plurality of cards, said card storage means comprising a plurality of boxes and including a first box designated for storing a first type of card and a second box designated for storing a second type of card;

card retrieval means for retrieving a card from one of said first and second boxes in said card storage means; and card discrimination means connected to said card retrieval means for examining the retrieved card, determining if the card retrieved by said card retrieval means is of the type associated with the box from which it was retrieved and, if the card is not of the type associated with the box from which it was retrieved, directing said card to a discard area.

2. The card trunk system according to claim 1, wherein said card discrimination means includes image matching means for comparing an image of a card retrieved from said first box to an image associated with said first type of card.

3. The card trunk system according to claim 2, wherein said image matching means includes an imaging device comprising a CCD.

4. The card trunk system according to claim 1, wherein the boxes in said card storage means are arranged in the form of an X-Y matrix, and wherein said card retrieval means is capable of moving in both an X and a Y direction to arrive at a box designated for storing a desired type of card.

5. The card trunk system according to claim 1, wherein said card storage means includes a first box moving means connected to said first and second boxes for moving one of said boxes to said card retrieval means such that said card retrieval means is capable of retrieving a card from the moved box.

6. The card trunk system according to claim 5, wherein said card storage means includes a second box moving means connected to a third and a fourth boxes and wherein said card retrieval means includes a first and a second picking out means associated with said first and second box moving means, respectively, such that said first picking out means is capable of retrieving a card from one of said first and second boxes and said second picking out means is capable of retrieving a card from one of said third and fourth boxes.

7. The card trunk system according to claim 6, wherein each of said box moving means includes a local controlling means connected to its associated card picking out means for controlling the movement of boxes connected to each box moving means and the retrieval by said associated picking out means of cards in said boxes.

8. The card trunk system according to claim 7, wherein said local controller means are capable of operating in parallel to retrieve a card from said first box and a card from said third box at the same time.

9. The card trunk system according to claim 7, wherein said system further comprises system controlling means for coordinating the retrieval of cards from boxes connected to different box moving means and wherein said local controlling means includes a local operation panel for operating said local controlling means to position a box and to retrieve a card in parallel with said system controlling means.

10. The card trunk system according to claim 1 wherein the system further comprises:

input means for entering a list of cards to be retrieved, said list including the number of cards of each type to be retrieved and the order in which they are to be retrieved; and card accommodation means connected to said card discrimination means for receiving and stacking retrieved cards in the order they are retrieved.

11. The card trunk system according to claim 10, wherein said card discrimination means includes image matching means for comparing an image of a card retrieved from said first box to an image associated with said first type of card.

12. The card trunk system according to claim 11, wherein said image matching means includes an imaging device comprising a CCD.

13. The card trunk system according to claim 10, wherein the boxes in said card storage means are arranged in the form of an X-Y matrix, and wherein said card retrieval means is capable of moving in both an X and a Y direction to arrive at a box designated for storing a desired type of card.

14. The card trunk system according to claim 10, wherein said card storage means includes a first box moving means connected to said first and second boxes for moving one of said boxes to said card retrieval means such that said card retrieval means is capable of retrieving a card from the moved box.

15. The card trunk system according to claim 14, wherein said card storage means includes a second box moving means connected to a third and a fourth boxes and wherein said card retrieval means includes a first and a second picking out means associated with said first and second box moving means, respectively, such that said first picking out means is capable of retrieving a card from one of said first and second boxes and said second picking out means is capable of retrieving a card from one of said third and fourth boxes.

16. The card trunk system according to claim 15, wherein said first and second box moving means include a card rack connected to said first and second boxes and said third and fourth boxes, respectively, such that the boxes can be rotated so as to place one of said boxes proximate to the picking out means associated with said box moving means and wherein each of said box moving means further includes a local controlling means connected to said card rack and to said card picking out means for controlling the rotation of the boxes and the retrieval of cards in said boxes.

17. The card trunk system according to claim 16, wherein said local controller means are capable of operating in parallel to retrieve a card from said first box and a card from said third box at the same time.

18. The card trunk system according to claim 16, wherein said system further comprises system controlling means for coordinating the retrieval of cards from boxes connected to different box moving means and wherein said local controlling means includes a local operation panel for directing said local controlling means to position a box and retrieve a card, such operation capable of being performed in conjunction with operations occurring within other box moving means under control of said system controlling means.

19. The card trunk system according to claim 1 wherein the system further comprises card accommodation means connected to said card discrimination means for receiving and stacking retrieved cards in the order they are retrieved.

20. The card trunk system according to claim 1, wherein said card discrimination means includes code reading means for reading encoded, magnetically recorded, data stored on a card retrieved from said first box and for comparing said encoded data to the data associated with said first type of card.

21. The card trunk system according to claim 1, wherein each of said boxes contains a sensor for indicating the number of cards remaining in the box.

22. The card trunk system according to claim 6, wherein said system further comprises system controlling means for coordinating the retrieval of cards from boxes connected to different box moving means.

23. The card trunk system according to claim 8, wherein said box moving means includes a plurality of racks containing boxes, said racks being rotatable so as to place a desired rack proximate to a picking out means.

24. The card trunk system according to claim 23, wherein each of said racks includes sensors for indicating the identity of the rack.

25. The card trunk system according to claim 15, wherein each of said box moving means includes a plurality of racks including boxes for storing cards and a local controlling means connected to said rack and to said card picking out means for controlling the movement of the racks and the retrieval of cards in said boxes, said racks being rotatable so as to place a desired rack close to a picking out means and further including a box pushing out mechanism for pushing a box within said rack proximate to said picking out means.

26. The card trunk system according to claim 25 wherein said card pushing out mechanism includes a solenoid coil and a rod installed within the solenoid coil such that it can slide along the coil axis in order to push out the box.

27. A method of retrieving cards from a card trunk unit in which boxes are used to store cards by type, comprising the steps of:
(a) entering the number of cards of a first card type that are to be retrieved, the number of cards of a second card type that are to be retrieved and the order in which the cards are to be retrieved;
(b) determining the next card type to be retrieved;
(b) determining a box associated with that next card type;
(c) retrieving a card from said box;
(d) obtaining an image of the card retrieved from said box;
(e) comparing said image against a card type image associated with said box;
(f) if said image matches said card type image, placing said card into a stack of cards for further processing;
(g) if said image does not match said card type image, directing said card to a discard area; and
(h) repeating steps (b) through (g) until the correct number of cards of each card type are in the stack.

* * * * *

UNITED STATES PATENT AND TRADEMARK OFFICE
CERTIFICATE OF CORRECTION

PATENT NO. : 5,060,275
DATED : October 22, 1991
INVENTOR(S) : Tadashi Hirano

It is certified that error appears in the above-identified patent and that said Letters Patent is hereby corrected as shown below:

Column 4, line 59, "car" should read --card--.
Column 6, line 10, "u it" should read --unit--.
Column 6, line 41, delete "f" after the numeral "74".
Column 9, line 33, "S4," should read --S4'--.
Column 10, line 24, "axes" should read --axis--.
Column 13, line 56, "282B" should read --382b--.
Column 20, line 14, "(b)" should read --(c)--.
Column 20, line 16, "(c)" should read --(d)--.
Column 20, line 17, "(d)" should read --(e)--.
Column 20, line 19, "(e)" should read --(f)--.
Column 20, line 21, "(f)" should read --(g)--.
Column 20, line 24, "(g)" should read --(h)--.
Column 20, line 26, "(h)" should read --(i)--.
Column 20, line 26, "(g)" should read --(h)--.

Signed and Sealed this

Eighth Day of June, 1993

Attest:

Attesting Officer

MICHAEL K. KIRK

Acting Commissioner of Patents and Trademarks